United States Patent
Leany et al.

(10) Patent No.: US 12,268,918 B2
(45) Date of Patent: Apr. 8, 2025

(54) EXERCISE EQUIPMENT ANCHOR FOR MOTOR VEHICLE

(71) Applicants: Francis E. Leany, Salem, UT (US); Jessica N. Leany, Orem, UT (US); Jordan T Leany, Salem, UT (US); Joe Fox, SpanishFork, UT (US)

(72) Inventors: Francis E. Leany, Salem, UT (US); Jessica N. Leany, Orem, UT (US); Jordan T Leany, Salem, UT (US); Joe Fox, SpanishFork, UT (US)

( * ) Notice: Subject to any disclaimer, the term of this patent is extended or adjusted under 35 U.S.C. 154(b) by 18 days.

(21) Appl. No.: 18/607,485

(22) Filed: Mar. 17, 2024

(65) Prior Publication Data
US 2024/0216749 A1 Jul. 4, 2024

(51) Int. Cl.
*A63B 21/16* (2006.01)
*A63B 21/04* (2006.01)
*A63B 21/055* (2006.01)
*B60D 1/58* (2006.01)

(52) U.S. Cl.
CPC .......... *A63B 21/16* (2013.01); *A63B 21/0442* (2013.01); *A63B 21/0557* (2013.01); *B60D 1/58* (2013.01)

(58) Field of Classification Search
CPC . A63B 21/16; A63B 21/0442; A63B 21/0557; A63B 21/4035; A63B 21/0552; B60D 1/58; B60R 3/007
See application file for complete search history.

(56) References Cited

U.S. PATENT DOCUMENTS

| | | | | |
|---|---|---|---|---|
| 7,192,007 | B2* | 3/2007 | Thomas | B66F 1/06 254/133 R |
| 7,451,996 | B2* | 11/2008 | Miles | B60D 1/46 280/495 |
| 9,327,564 | B2* | 5/2016 | Breeden | B60D 1/52 |
| 9,333,822 | B1* | 5/2016 | LaFave | B60R 9/06 |
| 10,307,634 | B2* | 6/2019 | Young | A63B 71/023 |
| 10,646,738 | B2* | 5/2020 | Arturo | A63B 23/03541 |
| 10,843,636 | B1* | 11/2020 | Derose | B60R 9/06 |
| 10,940,356 | B2* | 3/2021 | Anderson | A63B 21/4047 |
| 11,370,361 | B1* | 6/2022 | Rosario Gonzales | B60D 1/42 |
| 11,400,863 | B2* | 8/2022 | Klein | B60R 3/007 |
| 11,505,018 | B2* | 11/2022 | Kato | B60D 1/52 |
| 11,857,824 | B2* | 1/2024 | Hartigan, Sr. | A63B 21/1681 |
| 11,865,399 | B2* | 1/2024 | Seamans | A63B 71/02 |
| 11,919,436 | B2* | 3/2024 | Guffey | A63B 71/02 |

(Continued)

*Primary Examiner* — Steve Clemmons

(57) ABSTRACT

A multi-use exercise equipment anchor system adapted for removably mounting in a tubular receptacle disposed in line with a vehicle's chassis or frame. The tubular receptacle may be disposed along the chassis' center line or offset parallel to the chassis' center line. The equipment anchor may comprise a tubular comprising a first end portion angularly joined to a second end portion. The first end portion being at least partially inserted into the tubular receptacle and the second end portion extending from the receptacle and diagonally descending away from the receptacle to a point adjacent the surface on which the vehicle resides. The second end portion may comprise openings and other means for attaching exercise equipment such as elastic bands, a battle rope, or a landmine to the equipment anchor. The anchor may comprise a tubular comprising a square cross section, a rectangular cross section, or a circular cross section.

14 Claims, 18 Drawing Sheets

(56) References Cited

U.S. PATENT DOCUMENTS

| | | | | |
|---|---|---|---|---|
| 2002/0171226 A1* | 11/2002 | McCoy | ................... | B60D 1/52 |
| | | | | 280/491.5 |
| 2006/0186638 A1* | 8/2006 | Varner | ................. | A63B 71/023 |
| | | | | 280/506 |
| 2008/0128463 A1* | 6/2008 | Bryan | .............. | A63B 21/00047 |
| | | | | 224/486 |
| 2013/0053220 A1* | 2/2013 | Monaco | ................... | A63B 1/00 |
| | | | | 482/39 |
| 2014/0296037 A1* | 10/2014 | Razzaq | .............. | A63B 21/4033 |
| | | | | 482/99 |
| 2022/0016470 A1* | 1/2022 | Seamans | ................ | A63B 17/04 |
| 2024/0034111 A1* | 2/2024 | Humphrey | ............. | B60D 1/025 |

* cited by examiner

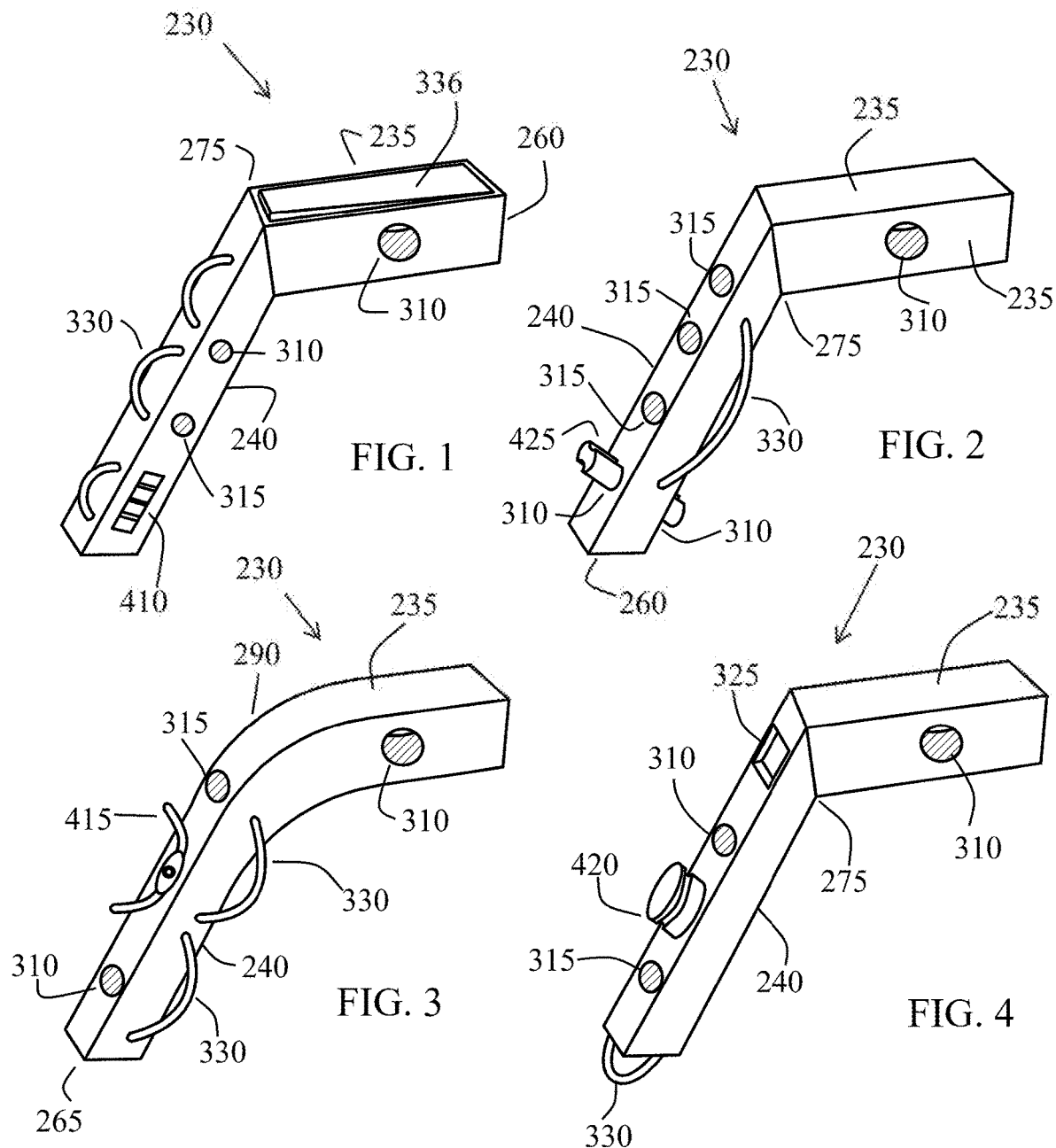

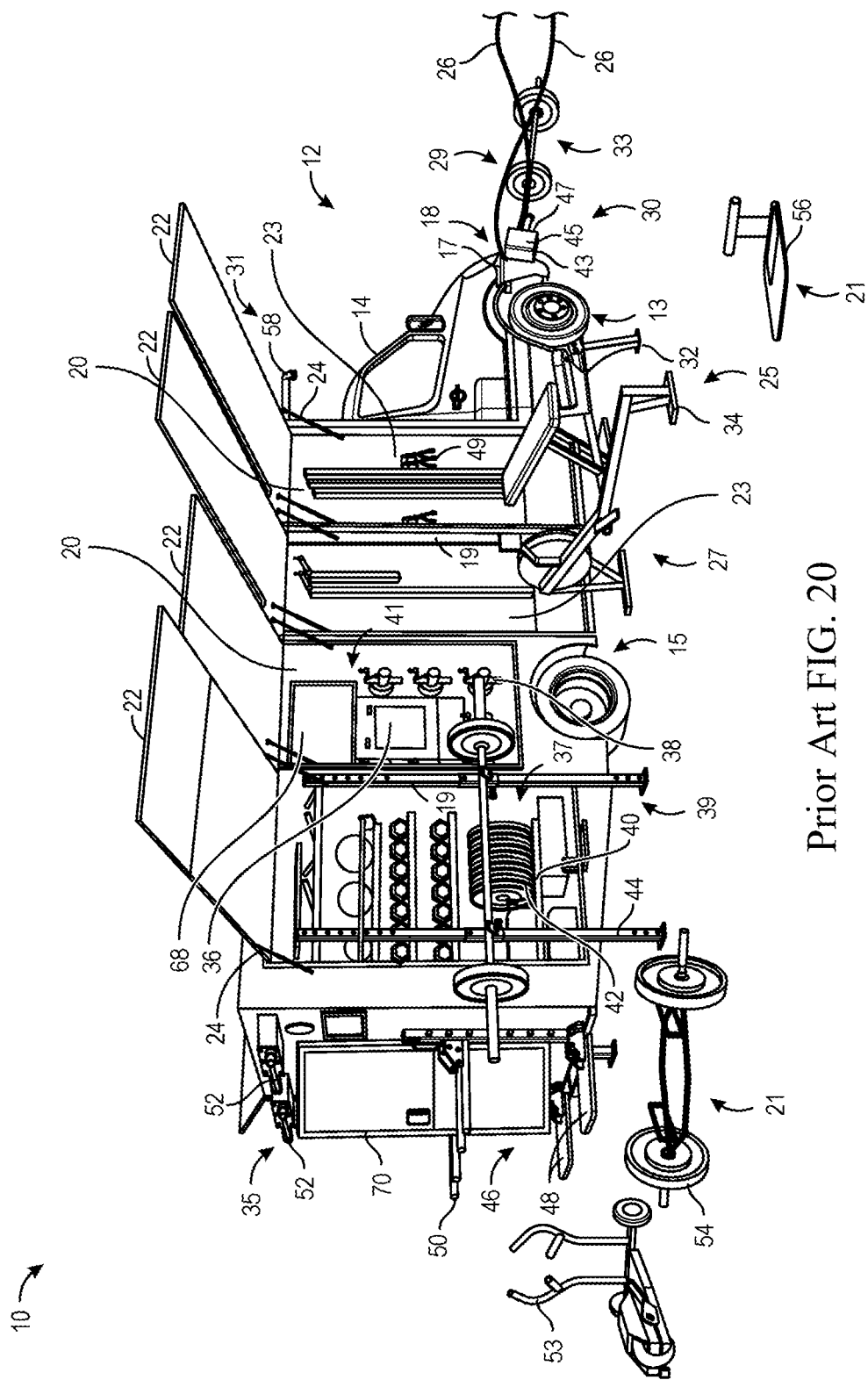
Prior Art FIG. 20

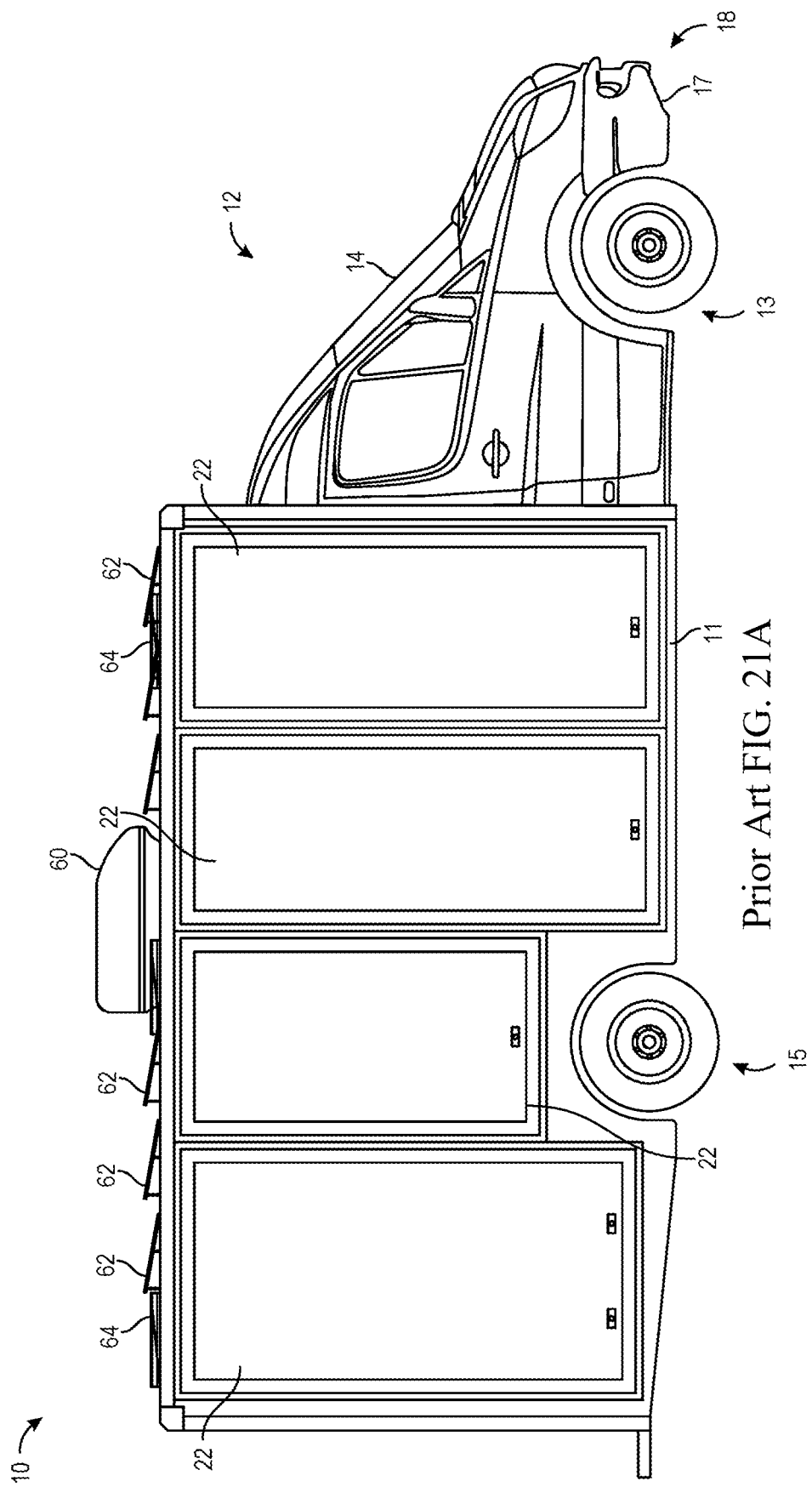
Prior Art FIG. 21A

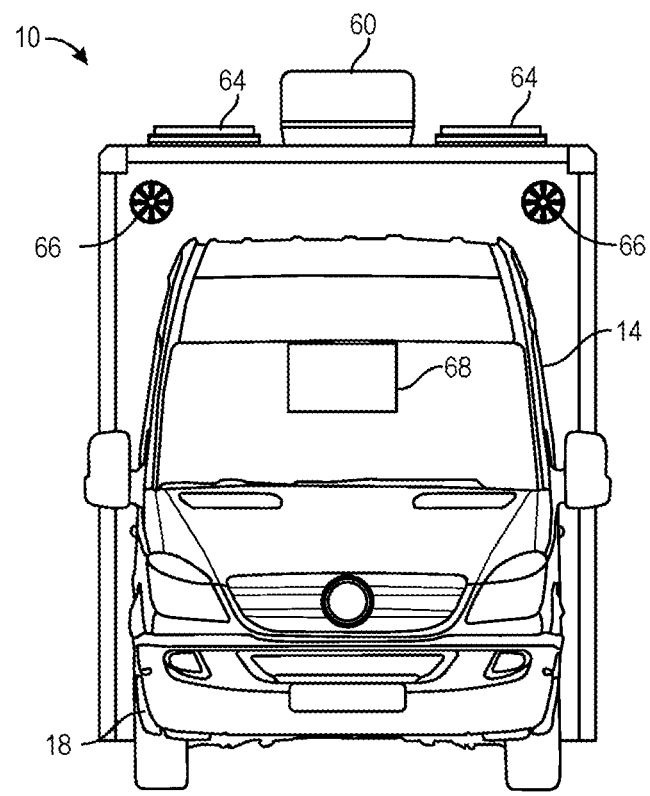
Prior Art FIG. 21B
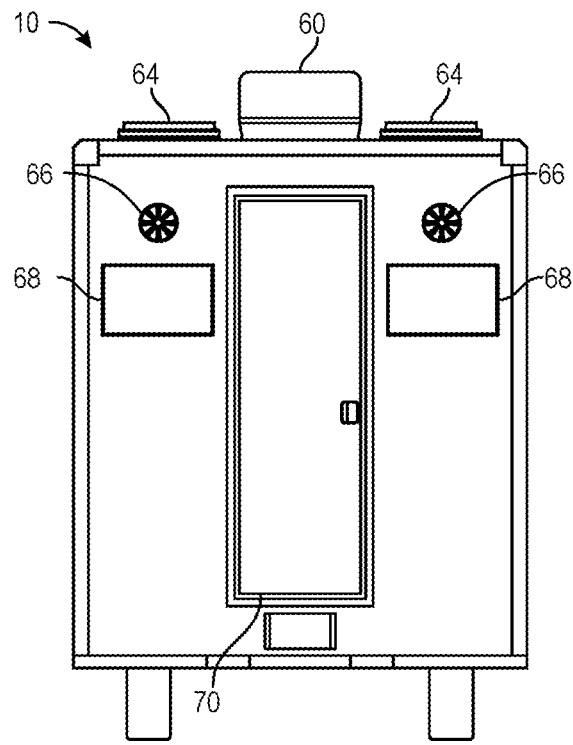
Prior Art FIG. 21C

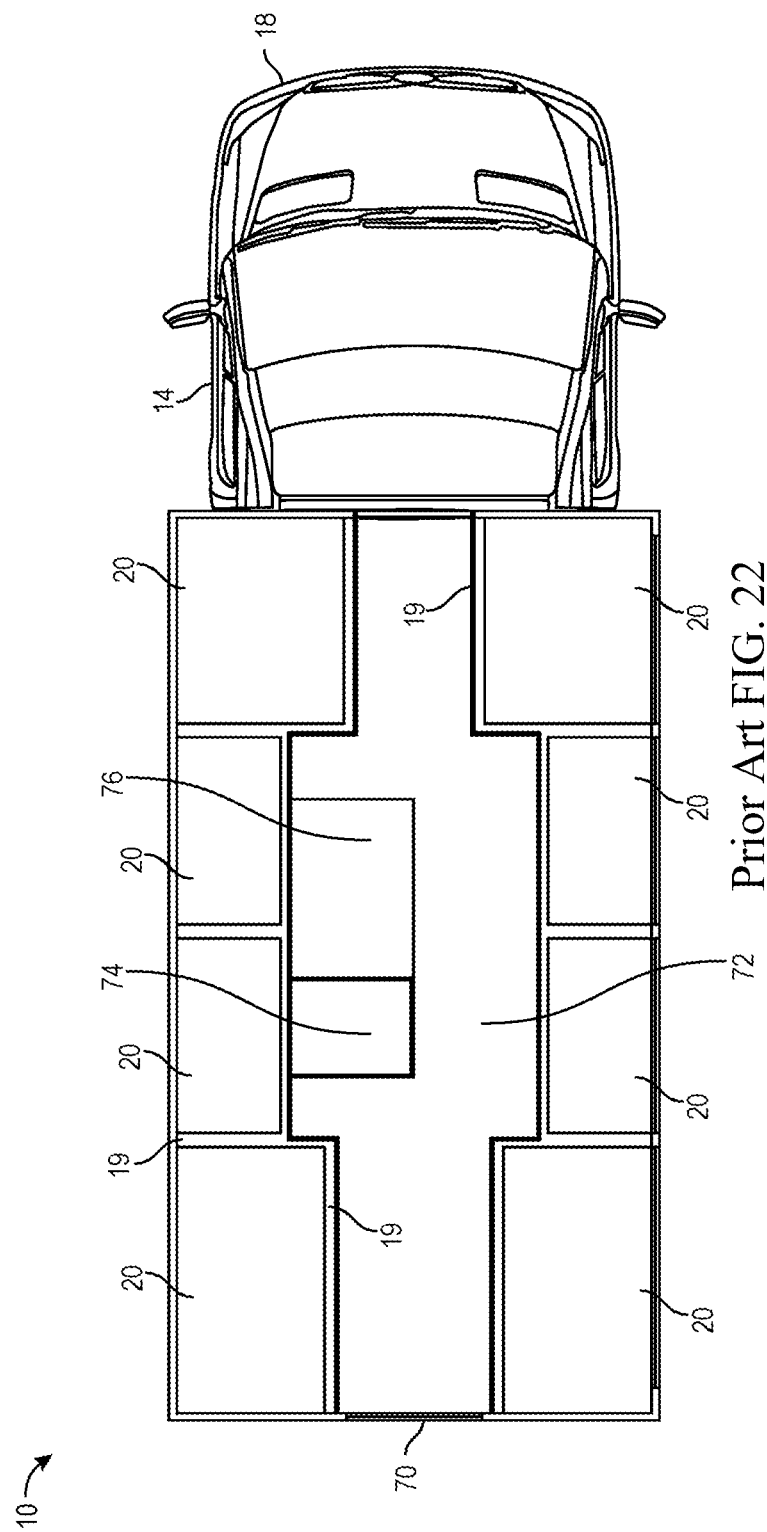

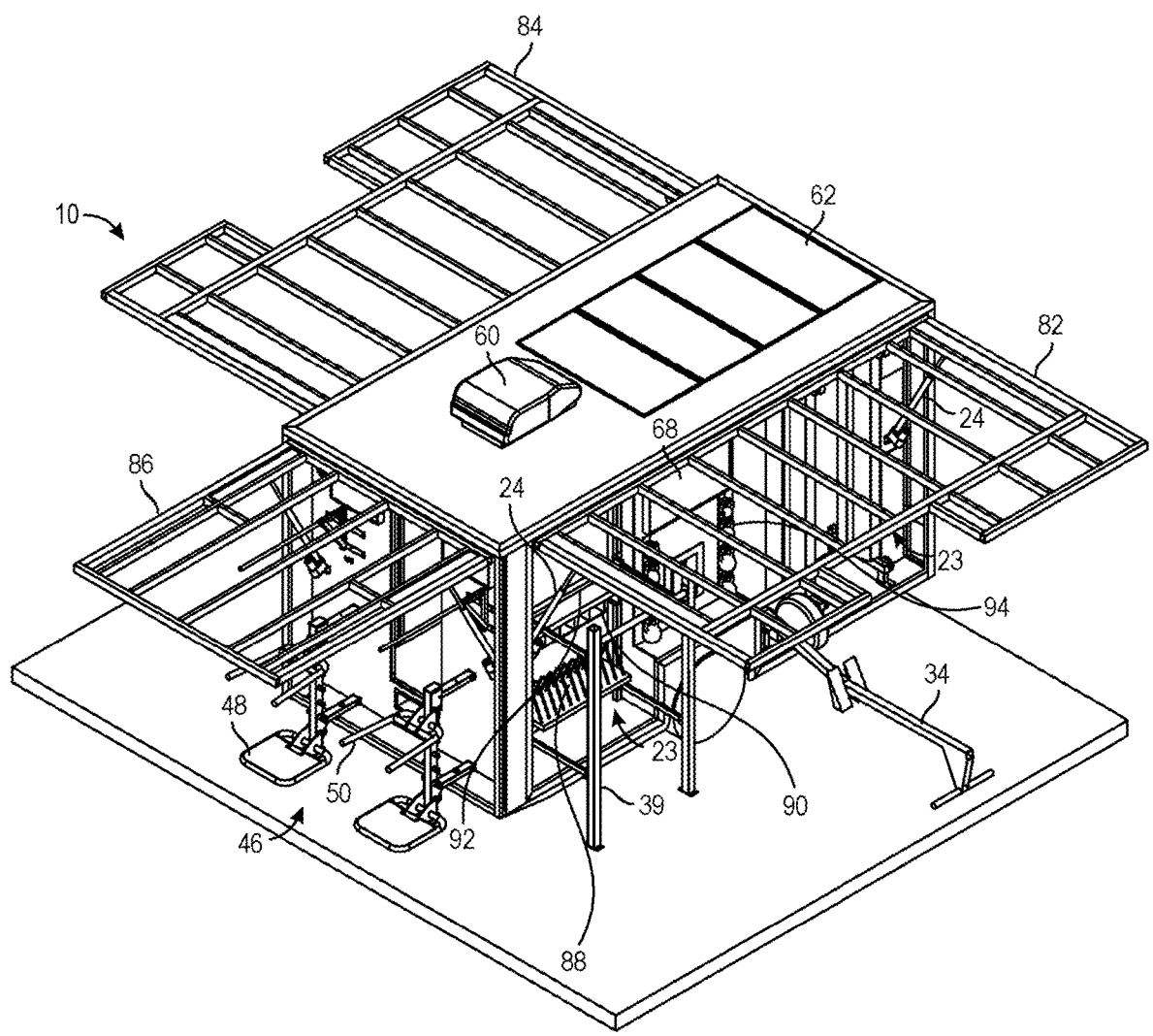
Prior Art FIG. 23

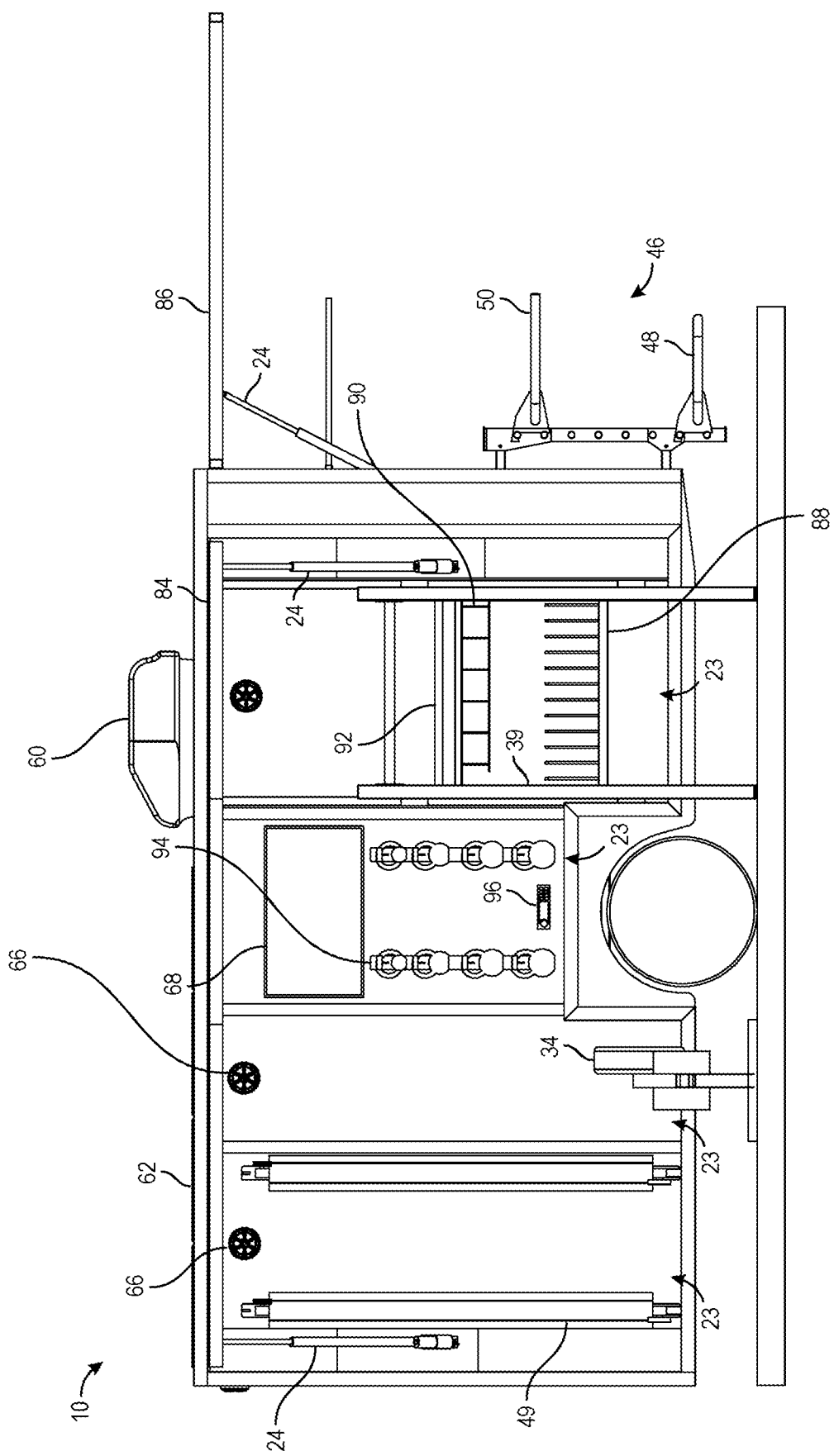
Prior Art FIG. 24

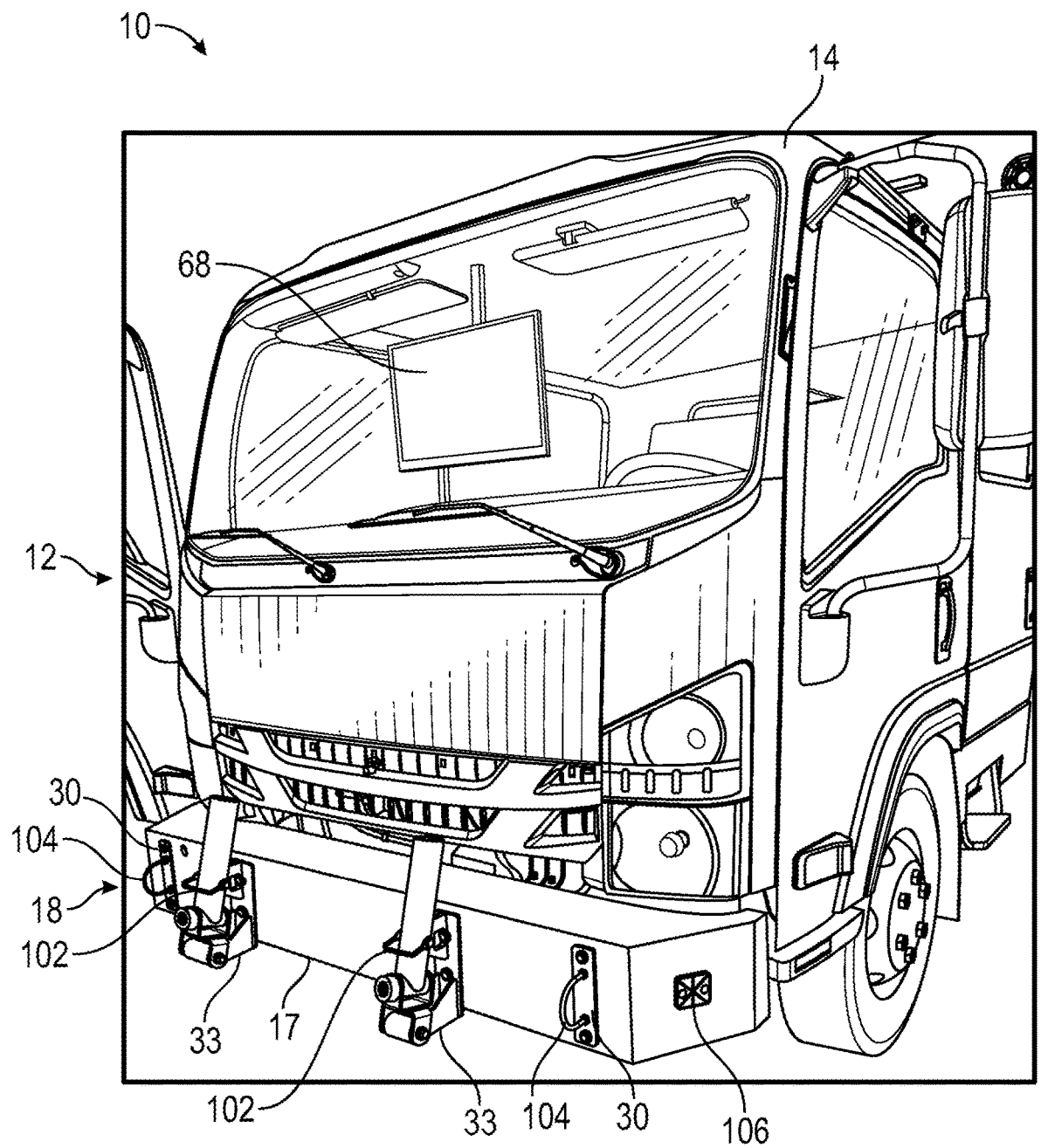
Prior Art FIG. 25

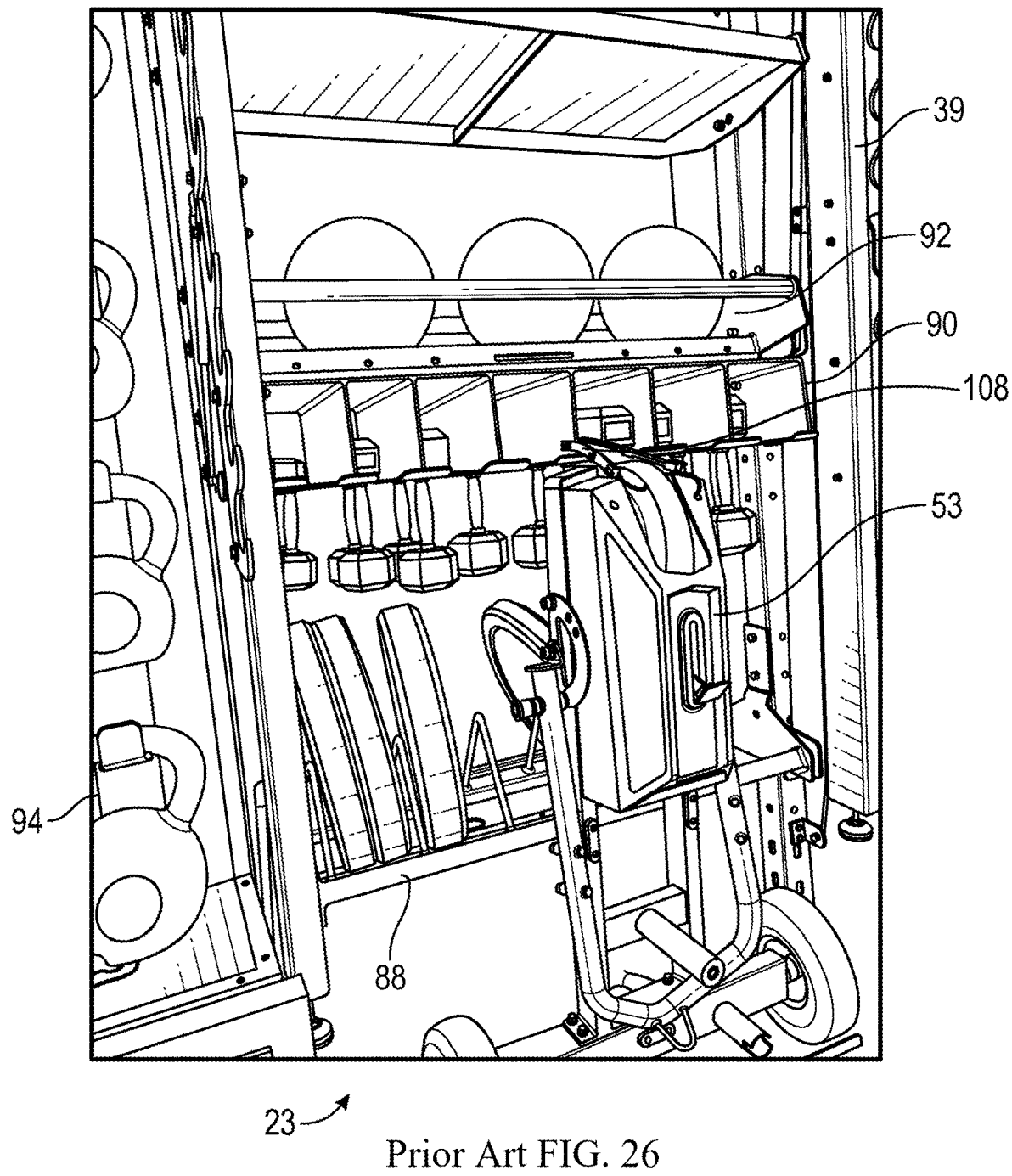
Prior Art FIG. 26

EXERCISE EQUIPMENT ANCHOR FOR MOTOR VEHICLE

RELATED APPLICATIONS

This application presents a modification and alteration of U.S. patent Ser. No. 11/919,436, dated Mar. 5, 2024, to Joshua E. Guffey, entitled MOBILE FITNESS PLAZA, which is incorporated herein by this reference in its entirety.

BACKGROUND

Personal fitness is a goal of many people. But personal fitness often requires a gym membership or a sizable investment in space consuming equipment. In many cases, people do not reach their fitness goals because of the inconvenience of going to a gym, the cost of personal equipment, lack of time and workout space, or the time and effort required to set up and take down bulky equipment. Low cost equipment and convenience are the main drivers for many who seek to reach their personal fitness goals.

The popularity of battle ropes as a workout is growing due to their effectiveness. Battle ropes must be attached to a secure anchor. Traditionally this has been ground anchors, posts (such as a fencepost), a heavy plate with a ring, or a device which attaches to a weight cage or other fitness equipment. This invention provides an easy way to attach a battle rope to a motor vehicle by means of a hitch receiver or other motor vehicle mounted receptacle. The battle rope works best when anchored close to the ground. Attaching it at the level of a hitch, for example tying it to the hitch or clipping it to the safely mounts, doesn't provide good handling for the rope. Therefore, this invention provides a secure mount which is close to the ground.

SUMMARY OF THE INVENTION

A multi-use exercise equipment anchor system that may be mounted on a motor vehicle. The anchor system may comprise a tubular receptacle attached horizontally to the motor vehicle and accessible from outside the motor vehicle. The tubular receptacle may be accessible from all exterior sides of the motor vehicle i.e. front, rear, left, and right exterior sides of the motor vehicle. The tubular receptacle may be disposed on and in line with the under chassis or frame of the motor vehicle. The tubular receptacle may be disposed along the longitudinal center line of the motor vehicle or it may be disposed at a location parallel to the right or left of the longitudinal center line of the motor vehicle. The tubular receptacle may comprise a mateable cross section such as a cross section forming a square cross section, a rectangular cross section, or a circular cross section. The mateable cross section receptacle may also include other complex shapes such as comprising lobes and clefts. The first end portion may comprise shapes that match and mate with the tubular receptacle including matching complex shapes comprising lobes and clefts.

A tubular member suitable for mating with at least one of the respective tubular receptacles may have a first end portion arranged a distance from a second end portion, and the first end portion may be at least partially adapted for insertion into the motor vehicle mounted tubular receptacle. Once the first end portion is inserted into the tubular receptacle, the second end portion remains free standing outside the tubular receptacle and the motor vehicle above the surface on which the motor vehicle resides. The first end portion may be attached to the second end portion at a joint. The joint may be a diagonal welded joint or other suitable diagonal connection. The second end portion may decline outward from the tubular receptacle and the motor vehicle at an angle of between 15° to 70° from the horizontal at the diagonal connection and extend to a point on or proximate the surface on which the motor vehicle may reside.

The first end portion may comprise a diameter different from the second end portion. The diameter of the first end portion may be greater or less than the diameter of the second end portion. When the cross section of the tubular member forms a square or rectangle, the diameter of the tubular member may be measured diagonally between opposite corners. When the cross section of the tubular member forms a circle, the diameter may be measured by a line extending from one side of the circle to the other side through a center point of the circle.

The first end portion and the second end portion may be joined by an intermediate connector mechanism comprising opposed rotating indexable plates mounted on an axle bearing, the bearings extending into and supporting the first end portion and second end portion. One of the indexable plates may be stationary while the other plate may rotate. The opposed rotating index plates may comprise a wheel or disk having graduations or stops that allow the second end portion to be rotated circularly and locked at a desired position in relation to the first end portion.

The first end portion and the second portion may be formed by bending the tubular member diagonally at the diagonal bend location. The diagonal bend location may be equidistant from the opposite ends of the tubular member, or the diagonal bend location may be biased toward the end of the second end portion. It may be desirable for the second end portion to extend to a point proximate or touching the surface on which the motor vehicle resides during use of the exercise equipment such as the battle rope, the elastic bands, or the land mine.

The length of the first end portion may be less than the length of the second end portion. The second end portion may be lengthened by inserting a telescoping member into the second end portion. The telescoping member may be a tube or a bar comprising openings that may correspond to the through holes in the second end portion. The openings may allow pins to be inserted to adjust the length of the telescoping member as needed for the desired exercise equipment being used. The second end portion may comprise one or more openings such as through holes, one or more blind holes, and or one or more threaded holes. The second end portion may also comprise a combination of opening designs as desired to accommodate the various exercise applications. Other opening designs may be sockets, socket inserts, threaded sockets and other recesses that may permit the attachment of additional pins, socket inserts, shackles, carabiners, cleats, posts, fluted posts, flexible anchors, D-ring tie downs, welded rings and loops, set screws, and other quick attachment methods such as track methods such as a modified channel tie down system. One such system is sold as "Trekassy E Track Tie-Down Kit." The second end portion may comprise one or more loops or rings, the loops may be attached to the second end portion by welding, bolting, screwing, or spring loading onto the second end portion.

The first end portion and the second end portion comprise a gusset plate disposed proximate the respective diagonal welded joints and the diagonal bends. The gusset plate may be welded or bolted in place. The gusset plate may comprise lightening holes. The gusset plates may promote rigidity in the first and second end portions.

A swivel connection for a landmine fixture may be removably attached to the second end portion. In some applications, it may be desirable for the swivel landmine fixture to be mounted as close as possible to the surface on which the motor vehicle resides. In different applications it may be desirable for the swivel landmine fixture to mounted and varying locations above the surface. The openings may accommodate mounting the land mine at different elevations in relation to the surface. Additionally, it may be desirable for the land mine fixture to be permanently attached to the second end portion.

A battle rope may be removably attached to the second end portion. The openings may be useful in mounting the battle rope onto the second end portion by threading the battle rope through the openings. Other mounting methods may include threading the battle rope through rings, shackles, loops, ladder fixtures, and flexible tie downs mounted onto the second end portion. The second end portion may be provided with varying means for locating the mounting methods at varying heights and orientations. Battle ropes are sold at sporting goods stores and outlets or online. For example, at REPfitness.com REP advertises its sleeve battle rope with grippy handles. The ropes come in varying lengths and are suitable for a variety of workout regimens. Other battle rope products are available ranging from sophisticated designs and materials to simple hemp rope. Rope diameters usually range from between 1-3 inches in diameter. The larger diameter ropes are more difficult to work with, requiring extreme exertion to operate the ropes. Another exercise configuration may be desirable such as providing two ropes, each rope being attached to the second end portion at separate locations. That way, when the two ropes are being worked, the oscillation of one rope may not interfere with the oscillation of the other rope.

The second end portion may be provided with one or more sockets that may be useful for mounting a variety of exercise facilities. For example, a socket insert comprising a flexible or rigid shaft may be inserted into the socket, the shaft may comprise resistance exercise elastic bands. The shaft may be of varying heights to accommodate the any particular exercise regimen or the height of the person exercising.

The first end portion may comprise one or more vibration dampers. The vibration dampers may be in the form of a wedge shaped pad, one or more buttons, or a tapered bushing. The vibration damper may comprise a natural or synthetic material having a hardness on the Shore A scale of between 20-80. The vibration damper may be desirable for reducing the noise and vibration produced by the exercise equipment attached to the anchor system or to the second end portion during a workout. Without the vibration damper, the anchor system may transfer the vibrations produced during a workout to the motor vehicle chassis or other parts of the motor vehicle causing damage to the motor vehicle and sensitive electronic equipment.

The second end portion may comprise a sensor and short range transmitter assembly for measuring vibrations or oscillations produced in the second end portion during a workout and transmitting the data to a digital readout screen observable by the user or transmitting the data to a portable device such as a smartphone or smart wristwatch.

BRIEF DESCRIPTION OF THE DRAWINGS

FIG. 1 is a perspective diagram of an embodiment of the anchor system of the present invention comprising a first end portion and a second end portion diagonally joined, the first end portion comprising a wedge pad vibration damper, and the second end portion comprising loops and mounting openings.

FIG. 2 is a perspective diagram of an embodiment of the anchor system of the present invention comprising mounting openings and a side mounted loop.

FIG. 3 is a perspective diagram of an embodiment of the anchor system of the present invention comprising a first end portion and a second end portion formed by bending.

FIG. 4 is a perspective diagram of an embodiment of the anchor system of the present invention comprising a first end portion and a second end portion having a variety of openings and a ring.

Figure 5:
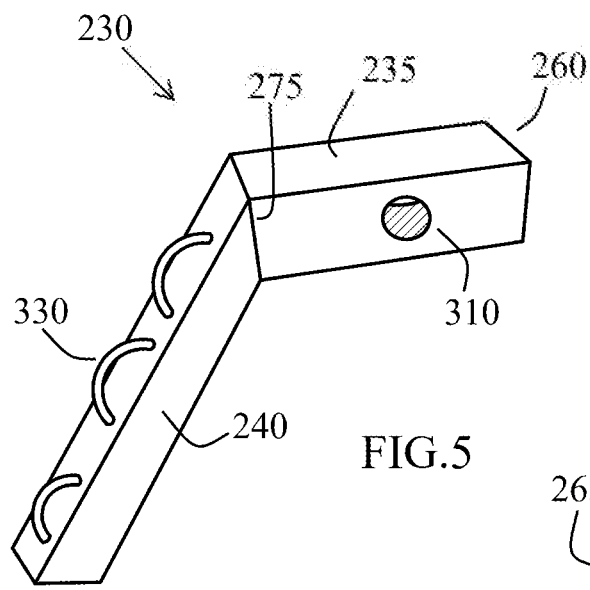
FIG. 5 is a perspective diagram of an embodiment of the anchor system of the present invention comprising a first end portion and a second end portion having mounting loops.
Figure 6:
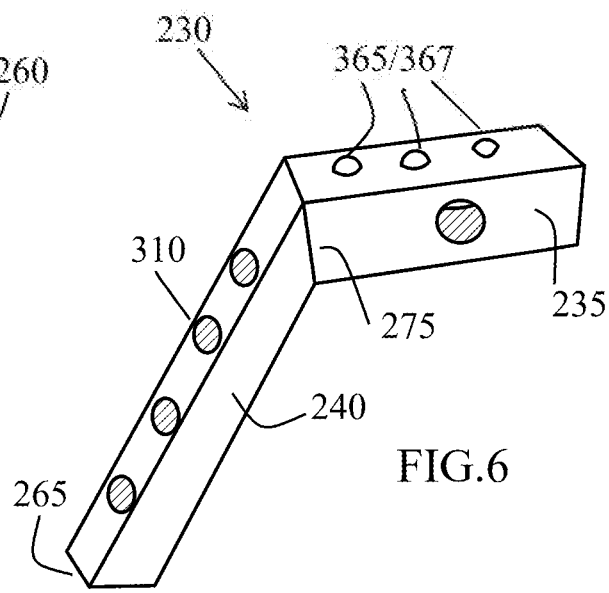
FIG. 6 is a perspective diagram of an embodiment of the anchor system of the present invention comprising a first end portion and a second end portion having, the first end portion having button vibration dampers.
Figure 7:
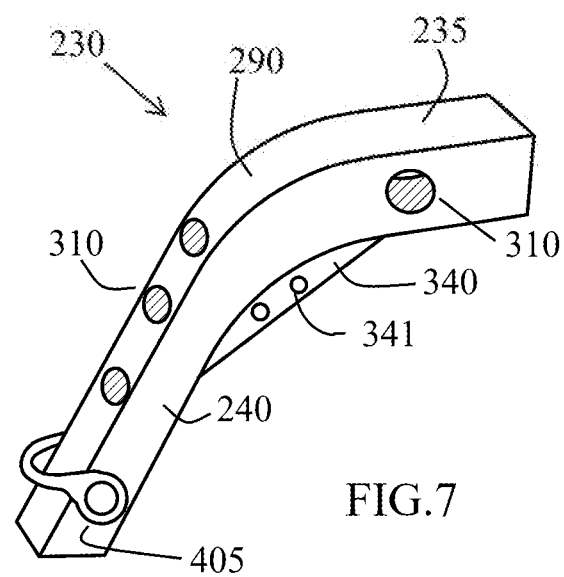
FIG. 7 is a perspective diagram of an embodiment of the anchor system of the present invention comprising a first end portion and a second end portion formed by bending and comprising gusset plate and a shackle.
Figure 8:
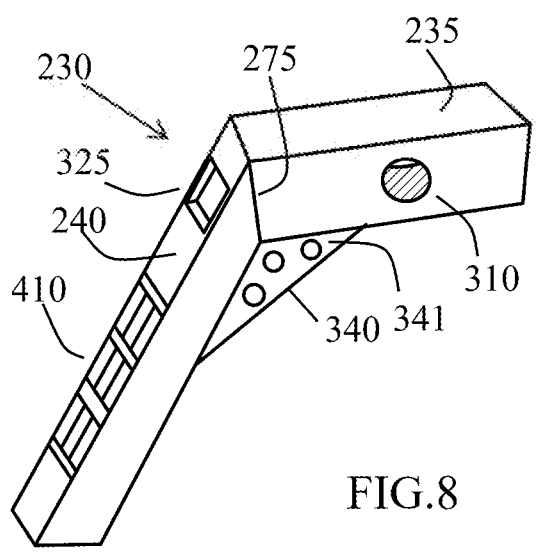
FIG. 8 is a perspective diagram of an embodiment of the anchor system of the present invention comprising a first end portion and a second end portion having gusset plate with lightening holes, and a ladder connection system.
Figure 9:
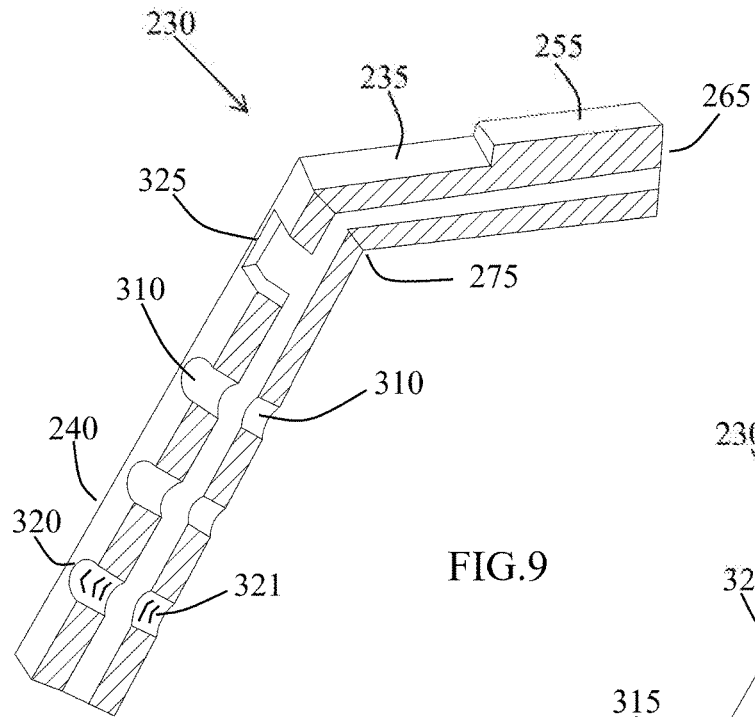
FIG. 9 is a sectioned perspective diagram of an embodiment of the anchor system of the present invention comprising a first end portion and a second end portion, the first end portion having a changing diameter and the second end portion having through holes.
Figure 10:
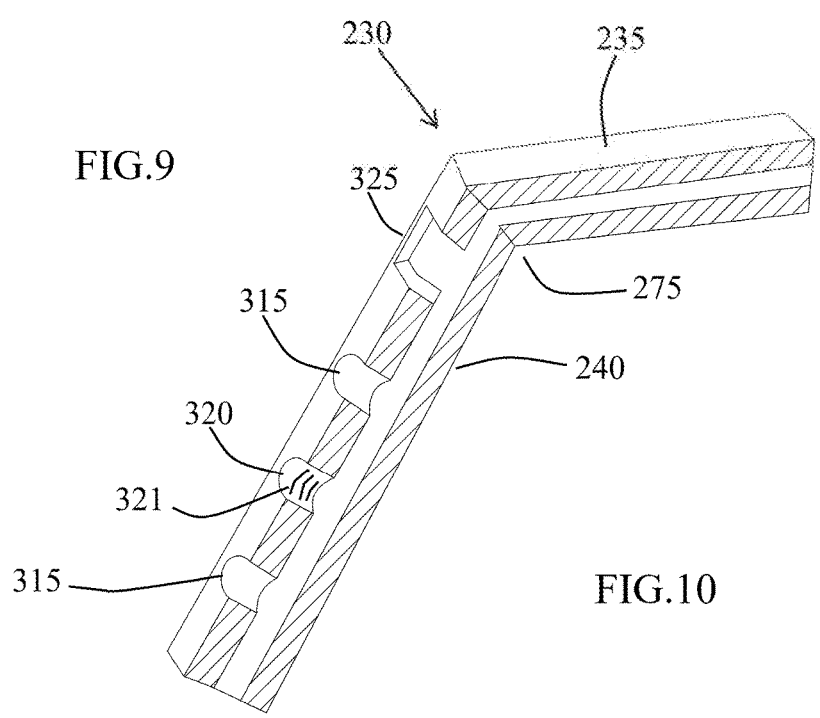
FIG. 10 is a sectioned perspective diagram of an embodiment of the anchor system of the present invention comprising a first end portion and a second end portion having blind holes.
Figure 11:
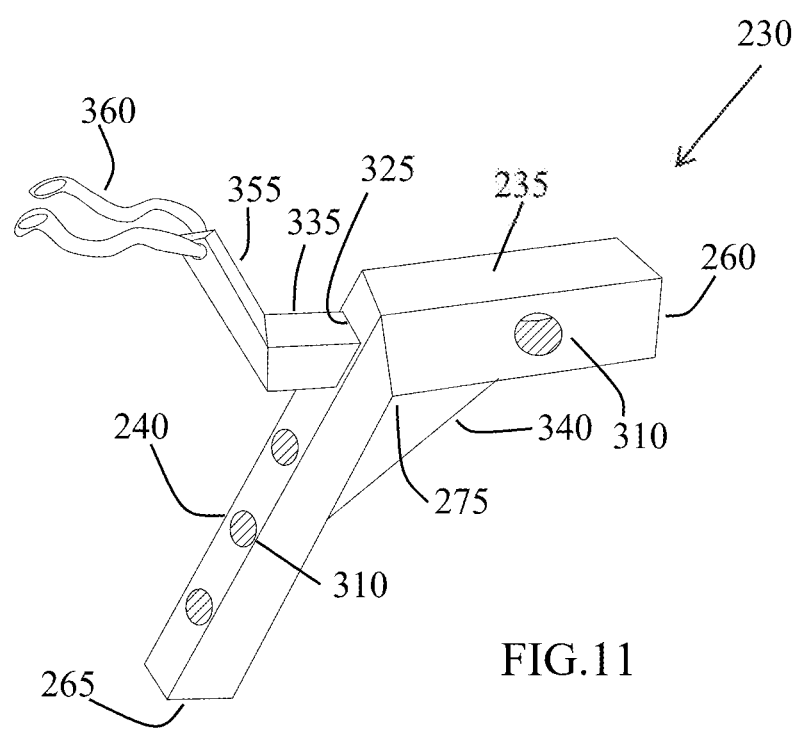
FIG. 11 is a perspective diagram of an embodiment of the anchor system of the present invention comprising a first end portion and a second end portion having a socket and socket insert comprising a mast with elastic bands.
Figure 12:
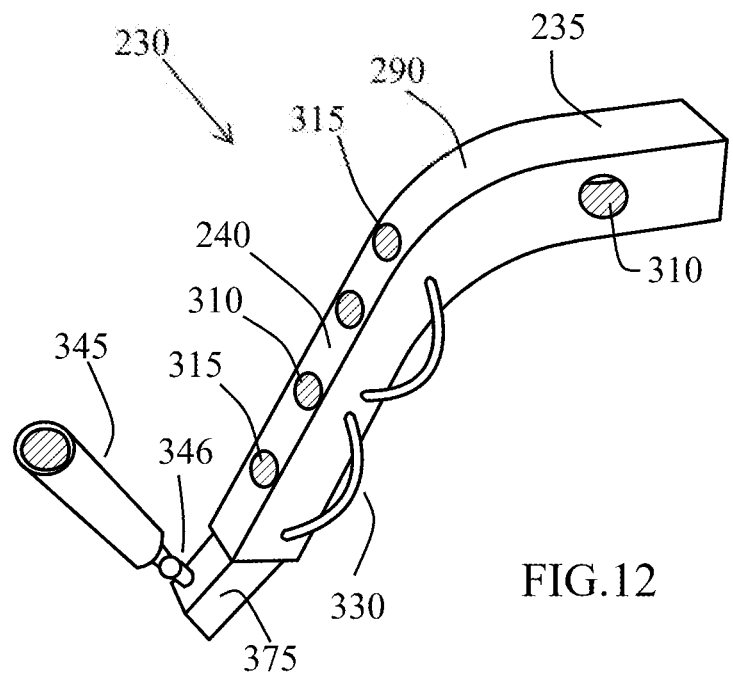
FIG. 12 is a perspective diagram of an embodiment of the anchor system of the present invention comprising a first end portion and a second end portion having a landmine attachment.
Figure 13:
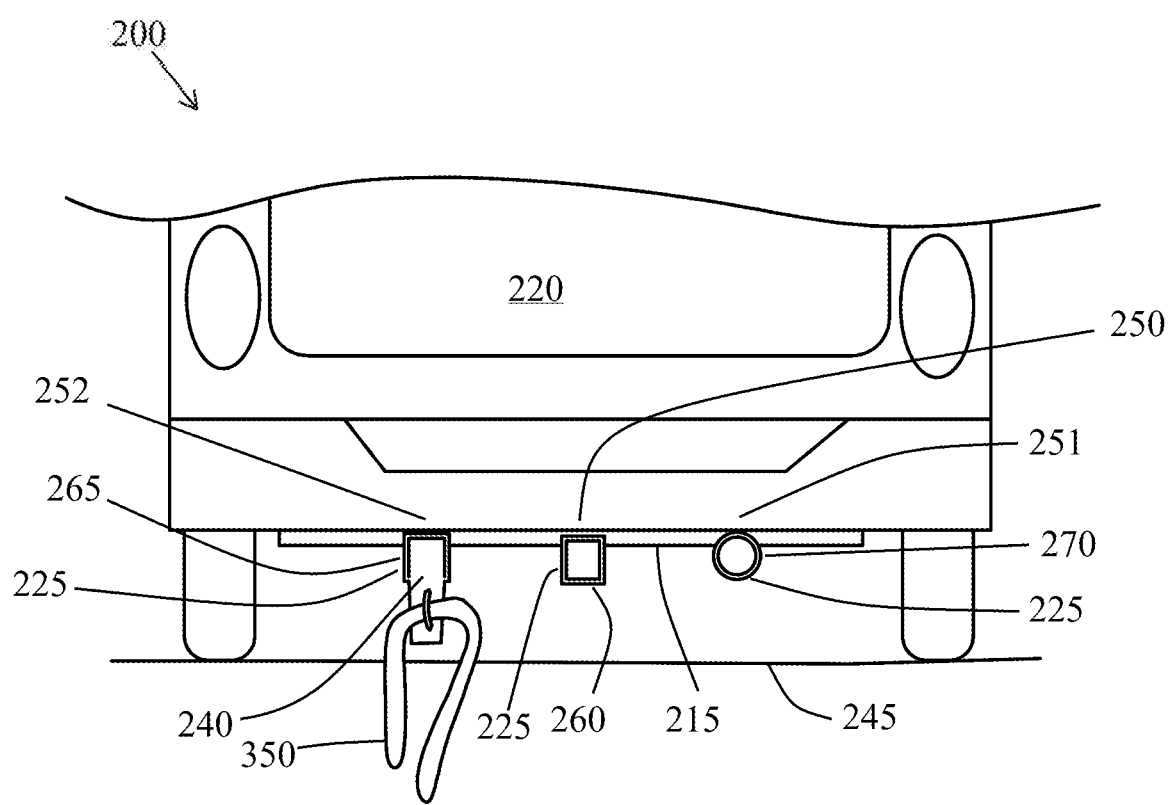
FIG. 13 is a diagram of an embodiment of the anchor system of the present invention comprising a second end portion descending from a motor vehicle.
Figure 14:
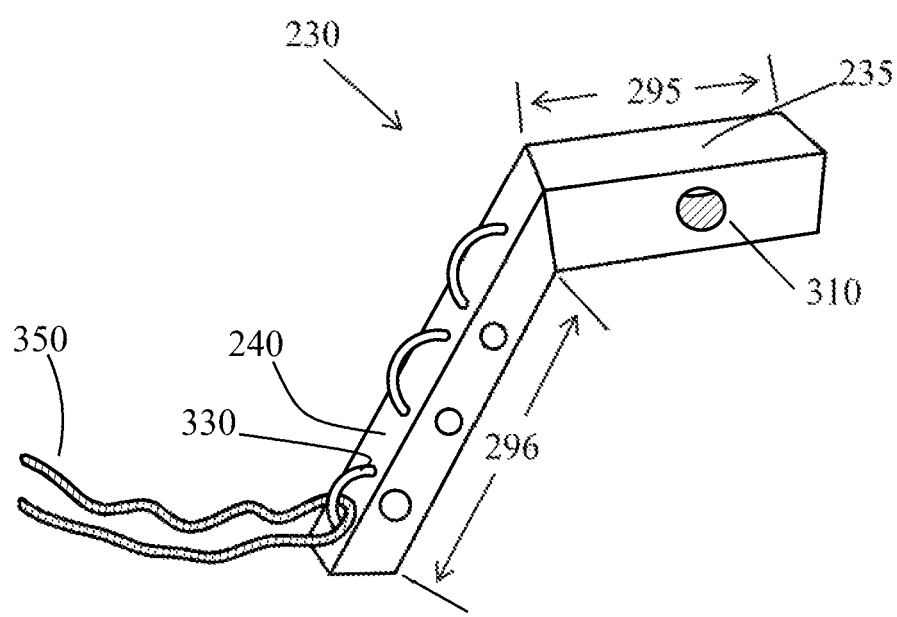
FIG. 14 is a perspective diagram of an embodiment of the anchor system of the present invention comprising a first end portion and a second end portion having loops and a battle rope threaded through one of the loops.
Figure 15:
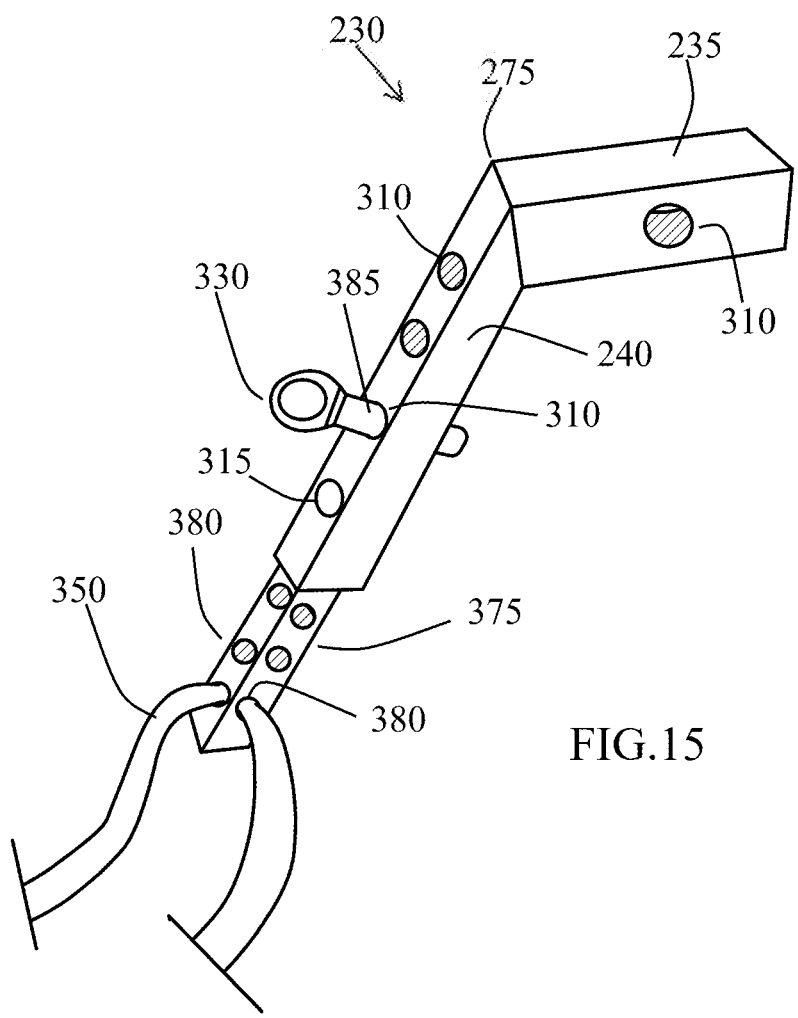
FIG. 15 is a perspective diagram of an embodiment of the anchor system of the present invention comprising a first end portion and a second end portion having an extension with a battle rope threaded through one of the openings.

Prior Art FIG. 20 schematically depicts a mobile fitness plaza that includes a plurality of fitness stations deployed for use by one or more athletes.

Prior Art FIG. 21A schematically depicts a side view of the mobile fitness plaza of Prior Art FIG. 20, with the plurality of fitness stations in a stowed position.

Prior Art FIGS. 21B and 21C schematically depict a front view and a rear view, respectively, of the mobile fitness plaza of Prior Art FIG. 20; and Prior Art FIG. 22 schematically depicts an example floor plan for a mobile fitness plaza.

Prior Art FIG. 23 illustrates an exemplary mobile fitness plaza relating to some embodiments of the present disclosure;

Prior Art FIG. 24 illustrates a side view of an exemplary mobile fitness plaza relating to some embodiments of the present disclosure;

Prior Art FIG. 25 illustrates a view of a front portion of an exemplary mobile fitness plaza relating to some embodiments of the present disclosure; and Prior Art FIG. 26 illustrates an exemplary alcove compartment relating to some embodiments of the present disclosure.

FIRST PORTION OF THE DETAILED DESCRIPTION OF THE INVENTION

The following first portion of the detailed description relates to FIGS. 1-19. The second portion of the detailed description which is taken from the '436 patent, incorporated herein, relates to prior art FIGS. 20-26. The second portion of the detailed description is applicable to the FIGS. 1-19 except as modified by said FIGS. 1-19 and related text.

A multi-use exercise equipment anchor system 200 may be mounted on a motor vehicle 220. The anchor system 200 may comprise a tubular receptacle 225 attached horizontally to the motor vehicle 220 and accessible from outside the motor vehicle 220. The tubular receptacle 225 may be accessible from all exterior sides of the motor vehicle 200 i.e. front, rear, left, and right exterior sides of the motor vehicle 220. The tubular receptacle 225 may be disposed on and in line with the under chassis or frame 215 of the motor vehicle 220. The tubular receptacle 225 may be disposed along the longitudinal center line 250 of the motor vehicle or it may be disposed at a location parallel to the right 251 or left 252 of the longitudinal center line 250 of the motor vehicle 220. The tubular receptacle 225 may comprise a mateable cross section such as a cross section forming a square cross section 260, a rectangular cross section 265, or a circular cross section 270. The mateable cross section receptacle may also include other complex shapes such as comprising lobes 390 and clefts 395. The first end portion 235 may comprise shapes that match and mate with the tubular receptacle including matching complex shapes comprising lobes 390 and clefts 395.

A tubular member 230 suitable for mating with at least one of the respective tubular receptacles 225, 260, 265, or 270 may have a first end portion 235 arranged a distance from a second end portion 240, and the first end portion 235 may be at least partially adapted for insertion into the motor vehicle mounted tubular receptacle 225. Once the first end portion 235 is inserted into the tubular receptacle 225, the second end portion 240 remains free standing outside the tubular receptacle 225 and the motor vehicle 220 above the surface 245 on which the motor vehicle resides. The first end portion 235 may be attached to the second end portion at a joint 275. The joint 275 may be a diagonal welded joint or other suitable diagonal connection. The second end portion 240 may decline outward from the tubular receptacle 225 and the motor vehicle 220 at an angle of between 15° to 70° from the horizontal at the diagonal connection 275 and extend to a point on or proximate the surface 245 on which the motor vehicle 220 may reside.

The first end portion 235 may comprise a diameter 255 different from the second end portion 240. The diameter 255 of the first end portion 235 may be greater or less than the diameter of the second end portion 240. When the cross section of the tubular member 230 forms a square or rectangle, the diameter of the tubular member 230 may be measured diagonally between opposite corners. When the cross section of the tubular member forms a circle, the diameter may be measured by a line extending from one side of the circle to the other side through a center point of the circle.

Figure 16:
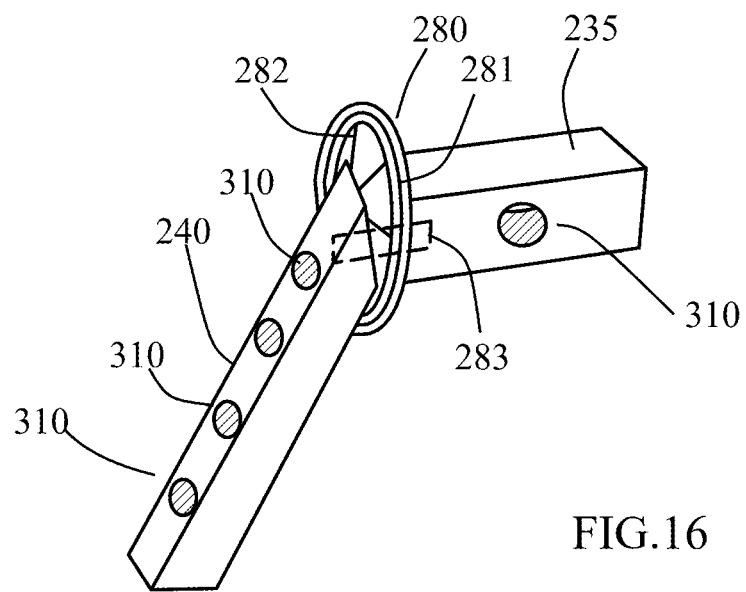
FIG. 16 is a perspective diagram of an embodiment of the anchor system of the present invention comprising a first end portion and a second end portion joined by a rotating connection system.
Figure 17:
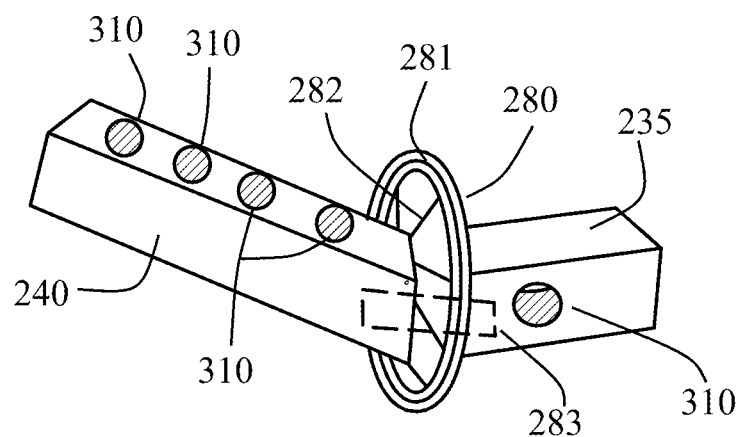
FIG. 17 is a perspective diagram of an embodiment of the anchor system of the present invention comprising a first end portion and a second end portion joined by a rotating connection system allowing for rotated orientation away from the declined position.
Figure 18:
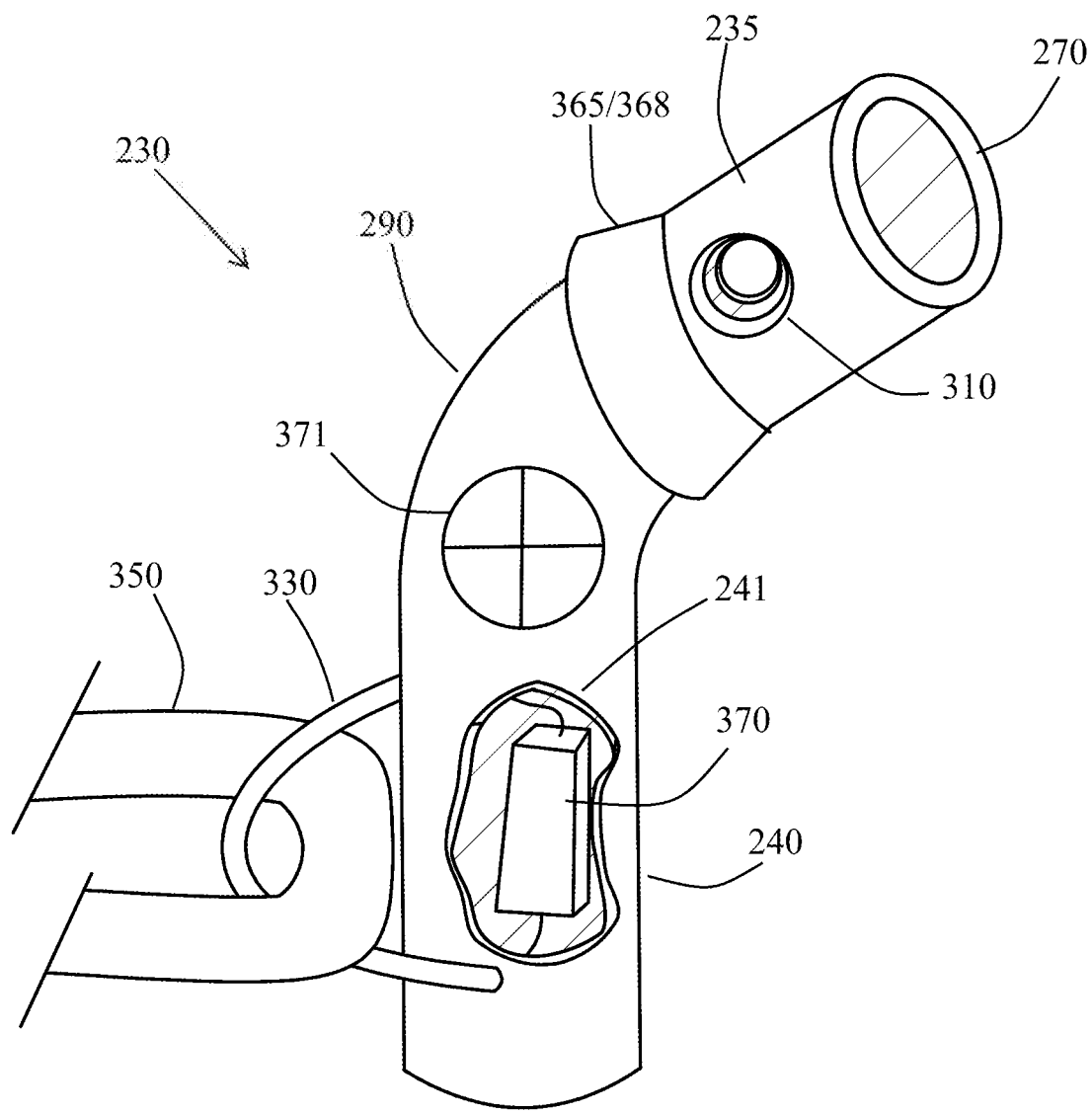
FIG. 18 is a perspective diagram of an embodiment of the anchor system of the present invention comprising a first end portion and a second end portion having a sensor and short range transmitter system for gathering information concerning the energy put into the exercise equipment. Also, a digital readout screen and a vibration damper.
Figure 19:
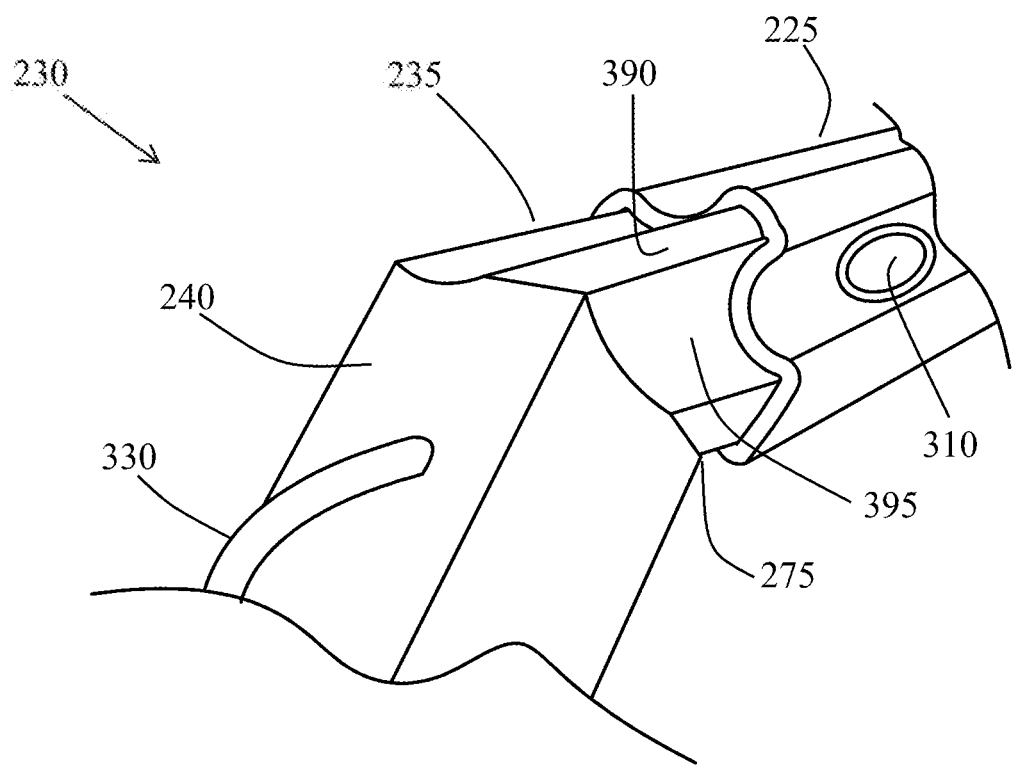
FIG. 19 is a perspective diagram of an embodiment of the anchor system of the present invention comprising a first end portion inserted into a receptacle having a complex cross section.

The first end portion 235 and the second end portion 240 may be joined by an intermediate connector mechanism 280 comprising opposed rotating indexable plates 281 mounted on an axle bearing 283, the bearings 283 extending into and supporting the first end portion 235 and second end portion 240. One of the indexable plates 281 may be stationary while the other plate 281 may rotate. The opposed rotating index plates 281 may comprise a wheel or disk having graduations or stops 282 that allow the second end portion 240 to be rotated circularly and locked at a desired position in relation to the first end portion 235. FIG. 17 depicts the second end portion 240 rotated away from the declined position as shown in FIG. 16.

The first end portion 235 and the second portion 240 may be formed by bending the tubular member 230 diagonally at the diagonal bend location 290. The diagonal bend location 290 may be equidistant from the opposite ends of the tubular member 230, or the diagonal bend location 290 may be biased toward the end of the second end portion 240. It may be desirable for the second end portion 240 to extend to a point proximate or touching the surface 245 on which the motor vehicle 220 resides during use of the exercise equipment such as the battle rope 350, the elastic bands 360, or the land mine 345.

The length 295 of the first end portion 235 may be less than the length 296 of the second end portion 240. The second end portion 240 may be lengthened by inserting a telescoping member 375 into the second end portion 240. The telescoping member 275 may be a tube or a bar comprising openings 380 that may correspond to the through holes 310 in the second end portion 240. The openings 280 may allow pins 385 to be inserted to adjust the length of the telescoping member 275 as needed for the desired exercise equipment being used. The second end portion 240 may comprise one or more openings such as through holes 310, one or more blind holes 315, and or one or more threaded holes 320 comprising threads 321. The socket openings 325 and socket inserts 335 may comprise threads. The second end portion 240 may also comprise a combination of opening designs as desired to accommodate the various exercise applications. Other opening designs may be closed and open ended sockets 325 for socket inserts 335, threaded sockets and other recesses that may permit the attachment of additional pins 385, socket inserts 335, shackles 405, cleats 415, hitching posts 420, fluted posts 425, carabiners, flexible anchors, D-ring tie downs, welded rings and loops 330, set screws, and other quick attachment methods such as track 410 methods such as a modified channel tie down system. One such system is sold as "Trekassy E Track Tie-Down Kit." The second end portion 240 may comprise one or more loops or rings 330, the loops 330 may be attached to the second end portion 240 by welding, bolting, screwing, or spring loading onto the second end portion 240.

The first end portion 235 and the second end portion 240 comprise a gusset plate 340 disposed proximate the respective diagonal welded joints 275 and the diagonal bends 290. The gusset plate 340 may be welded or bolted in place. The gusset plate may comprise lightening holes 341. The gusset plates 340 may promote rigidity in the first and second end portions.

A swivel 346 connection for a landmine fixture 345 may be removably attached to the second end portion 240. In some applications, it may be desirable for the swivel 346 landmine fixture 345 to be mounted as close as possible to the surface 245 on which the motor vehicle 220 resides. In different applications it may be desirable for the swivel landmine fixture 345 to mounted and varying locations above the surface 245. The openings 310, 315, and 320 may accommodate mounting the land mine 345 at different elevations in relation to the surface 245. Additionally, it may be desirable for the land mine fixture 345 to be permanently attached to the second end portion 240.

A battle rope 350 may be removably attached to the second end portion 240. The openings 310 may be useful in mounting the battle rope 350 onto the second end portion 240 by threading the battle rope through the openings 310. Other mounting methods may include threading the battle rope through rings, shackles, loops, ladder fixtures, and flexible tie downs mounted onto the second end portion 240. The second end portion may be provided with varying means for locating the mounting methods at varying heights and orientations. Battle ropes are sold at sporting goods stores and outlets or online. For example, at REPfitness.com REP advertises its sleeve battle rope with grippy handles. The ropes come in varying lengths and are suitable for a variety of workout regimens. Other battle rope products are available ranging from sophisticated designs and materials to simple hemp rope. Rope diameters usually range from between 1-3 inches in diameter. The larger diameter ropes are more difficult to work with, requiring extreme exertion to operate the rope. Another exercise configuration may be desirable such as providing two ropes, each rope being attached to the second end portion 240 at separate locations. That way, when the two ropes are being worked, the oscillation of one rope may not interfere with the oscillation of the other rope.

The second end portion 240 may be provided with one or more sockets 325 that may be useful for mounting a variety of exercise facilities. For example, a socket insert 335 comprising a flexible or rigid shaft 355 may be inserted into the socket 325, the shaft 355 may comprise resistance exercise elastic bands 360. The shaft 355 may be of varying heights to accommodate the particular exercise regimen or the height of the person exercising.

The first end portion may comprise one or more vibration dampers 365. The vibration dampers may be in the form of a wedge shaped pad 336, one or more buttons 367, or a tapered bushing 368. The vibration damper 365 may comprise a natural or synthetic material having a hardness on the Shore A scale of between 20-80. The vibration damper 365 may be desirable for reducing the noise and vibration produced by the exercise equipment attached to the anchor system 200 or to the second end portion 240 during a workout. Without the vibration damper 365, the anchor system 200 may amplify and transfer the vibrations produced during a workout to the motor vehicle chassis 215 or other parts of the motor vehicle causing damage to sensitive electronic equipment.

The second end portion 240 may comprise a sensor and short range transmitter assembly 370 (shown through cut out 241) for measuring vibrations or oscillations produced in the second end portion 240 during a workout and storing and transmitting the data to a digital readout screen 371 observable by the user or transmitting the data to a portable memory device such as a smartphone or smart wristwatch.

SECOND PORTION OF THE DETAILED DESCRIPTION

The following detailed description references the accompanying drawing figures that illustrate example embodiments of the presently disclosed subject matter. The present disclosure, including the example embodiments depicted in the drawing figures, describe features, aspects, and advantages of the of the disclosed subject matter by way of explanation and not limitation. Various modifications, combinations, and variations can be made to the example embodiments or to aspects or features thereof without departing from the scope of the presently disclosed subject matter. Thus, the present disclosure encompasses such modifications, combinations, and variations. The present disclosure provides sufficient detail to enable those skilled in the art to practice the claimed invention. The present disclosure is, therefore, not to be taken in a limiting sense. The scope of the invention is defined only by the appended claims, along with the full scope of equivalents to which such claims are entitled.

The present disclosure provides mobile fitness plazas. A mobile fitness plaza may include a variety of exercise equipment, including large equipment and machines commonly associated with a full-size gym, incorporated into a vehicle or other mobile equipment. A mobile fitness plaza may be deployed at various convenient locations where athletes may patriciate in workouts, including individual or group sessions, and the like. The presently disclosed mobile fitness plazas include a plurality of fitness stations that respectively have an alcove and an awning. The alcove may be configured to stow one or more items of equipment for transportation and when not in use. The awning may be pivotably couplable from a stowed position to a deployed position. In the stowed position, the awning may provide a closure to the alcove to secure the exercise equipment within the alcove. In the deployed position or an intermediate position, the awning may provide shade, protection from precipitation, protection from wind, and or various other weather. The presently disclosed mobile fitness facilities allow athletes to access various equipment such as barbell racks and other powerlifting equipment, rowing machines, exercise benches, and other large equipment. These and other items of equipment may be pivotably coupled to a wall within a respective alcove and may pivot from a stowed position within the alcove to a deployed position adjacent to the alcove. The adjacent awning may be deployed to a position that provides protection from various weather conditions during outdoor workouts.

In this description, references to "one embodiment," "an embodiment," or "embodiments" mean that the feature or features being referred to are included in at least one embodiment of the presently disclosed subject matter. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the scope of the presently disclosed subject matter encompasses a variety of combinations and/or integrations of the embodiments described herein.

The terms "a," "an," and "the" do not denote a limitation of quantity but rather denote the presence of at least one of the referenced item. The terms "first," "second," "third," and so forth may be used interchangeably to distinguish one item from another and are not intended to signify location or importance of the respective item. Range limitations in this description and in the claims include all endpoints, and all such endpoints are independently combinable to provide another range limitation.

The term "coupled," when used herein with reference to at least two objects, refers to direct or indirect mechanical or physical contact between two objects in which the two objects are linked, connected, fastened, secured, or joined with one another, including by way of an interference fit, one or more fastening elements or hardware, by welding, or the like. The term "coupled" includes objects that are removably coupled with Referring now to PRIOR ART FIG. 20, example embodiments of the present disclosure are further described. As shown in PRIOR ART FIG. 20, a mobile fitness plaza 10 may include and/or may be incorporated into a vehicle 12, such as a motor vehicle or a trailer. A vehicle that includes a mobile fitness plaza 10 may sometimes be referred to as a fitness vehicle 12. A fitness vehicle 12 may include one or more axles, such as a forward axle 13 and/or a rear axle 15. As shown, a mobile fitness plaza 10, such as a fitness vehicle 12, may include a plurality of fitness stations 20. The plurality of fitness stations 20 may be associated with one or more items of equipment 21, such as exercise equipment, fitness equipment, auxiliary equipment, or materials or supplies associated with such equipment or an exercise or a workout routine, as well as combinations of these. In some embodiments, a one or more of the fitness stations 20 may include an alcove 23 within which equipment 21 associated with the fitness station 20 may be stowed. Additionally, or in the alternative, one or more of the fitness stations 20 may include an awning 22. The awning 22 may have a rigid structure. The awning 22 may be pivotably couplable to the mobile fitness plaza 10, such as at an upward portion of the fitness plaza 10. The awning 22 may be pivotable from a stowed position to a deployed position, and/or to an intermediate position therebetween. In the stowed position, the awning 22 may provide a closure to the alcove 23 of a corresponding fitness station 20, such as to secure one or more items of equipment 21 within the alcove 23. In the deployed position, the awning 22 may provide weather protection to an athlete while utilizing a fitness station and/or to equipment 21 associated with the fitness station. For example, the awning 22 may provide shade and/or protection from precipitation and/or wind. By way of example, some exercises cause an athlete to look skyward, and the awning 22 may make such exercises more comfortable during various weather conditions. As another example, equipment may have a prolonged lifespan when protected from various weather conditions beneath the awning 22.

The awnings 22 may respectively include one or more latches configured to secure the respective awning 22 in a stowed position, for example, when traveling or when the mobile fitness plaza 10 and/or equipment 21 associated with a respective fitness station 20 is not in use, for example. In the stowed position, the awnings 22 may securely stow equipment 21 stowed within the corresponding alcove 23. The one or more latches may be located at a bottom portion of the awnings 22, coinciding, for example, to a bottom portion of a corresponding alcove 23. In some embodiments, an awning 22 may be supported by one or more support elements 24, such as one or more support arms, poles, linkages, hangers, or the like. As shown, the one or more support elements may include one or more telescopic gas springs. The one or more support elements may provide manual, automatic, and/or aided opening, closing, and/or positioning of the awnings 22, such as from a stowed position to a deployed position and/or to an intermediate position therebetween. Additionally, or in the alternative, the awnings 22 may be spring loaded or rely on a variety of other suitable opening, closing, and/or positioning mechanisms.

The awnings 22 may be secured to a top portion of the fitness plaza 10 by one or more hinges and/or other hardware. The awnings 22 may be pivotable about the one or more hinges, for example, to translate the respective awning 22 from the stowed position to the deployed position, and/or to selectively adjust a position of the awning. The awnings 22 may be pivotable about a hinge at a top portion of the fitness stations 20 such that an angle of the awnings 22 may be selectably adjusted to different angles and/or positions, for example, to coincide with incoming weather, such as a direction of rays of the sun, wind, or precipitation. In some embodiments, the awnings 22 may be extendable, for example, by way of a telescoping or foldable flap, as shown in PRIOR ART FIG. 20. For example, in some embodiments, the awning 22 may include a telescoping section which may be extended, while in a deployed position, to provide additional shelter from various weather conditions. Additionally, or in the alternative, the awning 22 may be configured to receive a tarp or curtain, for example, at an end of the awning 22 and/or at one or more sides of the awning 22, to provide further protection from various weather conditions.

Referring still to PRIOR ART FIG. 20, a mobile fitness plaza 10 may include a frame 11, supported by one or more axles, and a plurality of walls 19 supported by the frame 11. The mobile fitness plaza 10 may include a plurality of adjacently disposed fitness stations supported by the frame 11 and/or by one or more of the walls 19. At least some of the fitness stations 20 may be integrated with and/or defined by at least a portion of the frame 11 and/or by at least a portion of one or more walls 19 of the mobile fitness plaza 10. In some embodiments, the mobile fitness plaza 10 may include a plurality of fitness stations that respectively include an alcove 23 and a corresponding awning 22.

The mobile fitness plaza 10 may include further fitness stations 20 that do not have an alcove 23 and/or that do not have an awning 22, such as a fitness station that has an awning without an alcove 23, and or an alcove without an awning 22. The plurality of fitness stations 20 may be selected, for example, based at least in part on the nature of exercises, workout sessions, and/or other physical activities intended to be performed in association with the mobile fitness plaza 10. For example, a mobile fitness plaza 10 may include one or more fitness stations 20 that include equipment 21 configured for weightlifting (e.g., free weights, machines, etc.), strength training, power lifting, aerobics, cardio, boot-camps, high-intensity interval training, endurance training, boxing, kickboxing, cycling (e.g., spinning, etc.), rowing, running, gymnastics, dance, sports-specific workouts (e.g., team sports and/or individual sports), Pilates, Barre, physical therapy, massage, stretching, and so forth.

For example, as shown in PRIOR ART FIG. 20, the plurality of fitness stations 20 may include a powerlifting station 39. Additionally, or in the alternative, the plurality of fitness stations 20 may include a rowing station 27. Additionally, or in the alternative, the plurality of fitness stations 20 may include a bench station 25. Additionally, or in the alternative, the plurality of fitness stations 20 may include a suspension station 31. Additionally, or in the alternative, the plurality of fitness stations 20 may include a rope station 29. Additionally, or in the alternative, the plurality of fitness stations 20 may include a pivotable barbell station 33. Additionally, or in the alternative, the plurality of fitness stations 20 may include a pull-up station 35. Additionally, or in the alternative, the plurality of fitness stations 20 may include a dipping station 46. Additionally, or in the alternative, the plurality of fitness stations 20 may include a free-weights station 37. Additionally, or in the alternative, the plurality of fitness stations 20 may include a resting station 41.

The plurality of fitness stations 20 may be oriented about any one or more sides of the mobile fitness plaza 10. As shown in PRIOR ART FIG. 20, a mobile fitness plaza 10 may include a plurality of fitness stations 20 disposed about a longitudinal side, such as a starboard side and/or a port side, of the mobile fitness plaza 10. Additionally, or in the alternative, the mobile fitness plaza 10 may include one or more fitness station 20 disposed about a lateral side, such as a forward side and/or an aft side. In some embodiments, an identical set of fitness stations 20 may be disposed on an opposite side of the mobile fitness plaza 10. Additionally, or in the alternative, the mobile fitness plaza may include one or more fitness stations 20 that differ from one another with respect to opposite sides of the mobile fitness plaza 10. For example, opposite sides of the mobile fitness plaza 10 may include different equipment 21, such as equipment for different exercises, equipment 21 that has different sizes, and/or equipment 21 for different skill levels. A plurality of athletes may progress through a circuit that includes all or a portion of the fitness stations 20. In some embodiments, a similar or identical arrangement of fitness stations 20 may allow a first one or more athletes and a second one or more athletes to progress through a corresponding plurality of fitness stations 20, such as in a competitive or time-based format.

As shown in PRIOR ART FIG. 20, a fitness station 20 may include one or more items of equipment 21 that articulate from a stowed position within an alcove 23 to a deployed position adjacent to the alcove 23. The one or more items of equipment 21 may be coupled to one or more walls of the alcove 23, such as a back wall and/or a lateral wall of the alcove 23. The awning 22 corresponding to the alcove 23 may provide at least partial coverage from various weather at a location adjacent to the alcove 23. For example, at least a portion of the equipment 21 may be disposed beneath the awning 22 when the equipment 21 and the awning 22 are in the deployed position.

In some embodiments, as shown in PRIOR ART FIG. 20, a fitness station 20 may include one or more items of equipment 21 associated with a powerlifting station 39 that articulate from a stowed position within an alcove 23 to a deployed position adjacently outside of the alcove 23. For example, as shown, a barbell rack 44 may be pivotably coupled to one or more walls of the alcove 23. The barbell rack 44 may be articulated to a deployed position by one or more pivoting deployment arms. The deployment arms may be coupled to one or more sides of the barbell rack 44. The barbell rack 44 may be deployed and/or stowed by articulating the deployment arms, thereby pivoting the barbell rack 44 to the respective deployed or stowed position. The deployment arms may allow the barbell rack 44 to fit within the alcove 23 such that the awning 22 may secure the barbell rack 44 therein when in the stowed position. The deployment arms may allow the barbell rack 44 to rest upon the ground adjacent to the alcove 23 when in the deployed position. In some embodiments, the barbell rack 44 may be foldable at one or more locations for storage within the alcove 23. The alcove 23 may include a latch configured to secure the barbell rack 44 within the alcove 23. The alcove 23 may include one or more support structures, such as the one or more deployment arms and/or the latch, that support the weight of the barbell rack 44. The barbell rack 44 may be configured and arranged for supporting a barbell, such as an Olympic size barbell, bearing barbell plates that have an aggregate weight of several hundred pounds, including, for example, in positions commonly associated with a barbell position used for squats, bench press, deadlifts, cleans, jerks, lunges, and/or other power lifting exercises.

The barbell rack 44 may have a standard width. For example, the barbell rack 44 may have a width of from about 24 to 54 inches, such as from about 42 to 54 inches. The barbell rack 44 may have a fixed width or an adjustable width. The barbell rack 44 may have a height of from about 60 to 100 inches, such as from about 80 to 100 inches. The barbell rack 44 may have a fixed height or an adjustable height. Additional dimensions are also contemplated. In some embodiments, the barbell rack 44 may include a pull-up bar integrated into the top of the barbell rack 44, as shown. In some embodiments, the fitness station 20 may include a foldable step, for example, that folds out from within an alcove 23 to a location adjacent to the alcove 23. The foldable step may provide access to the pull-up bar.

In some embodiments, as shown in PRIOR ART FIG. 20, the powerlifting station 39 may be located at a rearward position of the mobile fitness plaza 10, such as at a position located rearward of a rear axle 15 of the mobile fitness plaza 10. In some embodiments, a mobile fitness plaza 10 that includes a fitness station 20 with an alcove 23 configured to stow a barbell rack 44 may include a rear overhang rearward from the rear axle 15 of from 48 to 90 inches, such as from 60 to 90 inches. The rear overhang may be configured and arranged to accommodate the width of the powerlifting station 39, such as to accommodate an alcove 23 configured to stow a barbell rack 44 therein.

The awning 22 may be configured and arranged to provide protection to the barbell rack 44 when in a deployed position and/or to a barbell and/or barbell plates when situated on the barbell rack 44. Protection of the barbell and/or barbell plates from various weather conditions may provide a safety measure for the powerlifting station 39. For example, the awning 22 may provide protection from the barbell plates and/or the barbell becoming wet with precipitation. Additionally, or in the alternative, the awning 22 may provide protection from the barbell plates and/or the barbell becoming excessively hot from exposure to solar rays. In some embodiments, the location of the powerlifting station 39 provides a degree of separation from other fitness stations 20 sufficient to allow an athlete to perform exercises associated with the powerlifting station 39 at a safe distance from other athletes who may be performing exercises at an adjacent fitness station 20.

As shown in PRIOR ART FIG. 20, a resting station 41 may be located adjacent to the powerlifting station 39. The resting station may provide further separation between adjacent fitness stations 20 that include exercise equipment 21, such as between the powerlifting station 39 and the rowing station 27. The resting station 41 may include a beverage dispenser 36. The beverage dispenser 36 may dispense water, ice, sports drinks, and/or other beverages. The beverage dispenser 36 may include a cooler, a refrigeration system, a freezer, an ice maker, or the like. In some embodiments, a beverage dispenser 36 may be included at one or more fitness stations 20 in addition or in the alternative to the resting station 41. Additionally, or in the alternative, the resting station 41 may include a video display screen 68. Additionally, or in the alternative, the resting station 41 may include one or more storage racks 40.

Referring still to PRIOR ART FIG. 20, in some embodiments, a fitness station 20 may include one or more items of equipment 21 associated with a rowing station 27 that articulate from a stowed position within an alcove 23 to a deployed position adjacently outside of the alcove 23. In some embodiments, a rowing machine 34 may be removably placed within an alcove 23. For example, as shown, a rowing machine 34 may be pivotably coupled to one or more walls of the alcove 23. The rowing machine 34 may be articulated to a deployed position by one or more pivoting deployment arms. The one or more deployment arms may be coupled to a forward portion of the rowing machine 34. In a stowed position, the rowing machine 34 may be oriented within the alcove 23 with the forward portion of the rowing machine 34 facing downward and a rearward portion of the rowing machine 34 facing upward. In some embodiments, the rowing machine 34 may be pivoted forward or aft when in the stowed position. The deployment arms may allow the rowing machine 34 to fit within the alcove 23 such that the awning 22 may secure the rowing machine 34 therein when in the stowed position. The deployment arms may allow the rowing machine 34 to rest upon the ground adjacent to the alcove 23 when in the deployed position. In the deployed position, a forward portion of the rowing machine 34 may be oriented towards the alcove 23. For example, the rowing machine 34 may be oriented perpendicular to the alcove 23 or obliquely facing the alcove 23 when in a deployed position. When using the rowing machine 34, an athlete may face the alcove 23, providing space for the athlete to lean back when performing a rowing motion. A video display screen 68 may be located in the alcove 23 of the rowing station 27. In some embodiments, the rowing machine 34 may be foldable at one or more locations for storage within the alcove 23. The alcove 23 may include a latch configured to secure the rowing machine 34 within the alcove 23. The alcove 23 may include one or more support structures, such as the one or more deployment arms and/or the latch, that support the weight of the rowing machine 34. By way of example, the rowing machine 34 may be a rowing ergometer, such as a Concept2® rowing ergometer.

As further shown in PRIOR ART FIG. 20, in some embodiments, a fitness station 20 may include one or more items of equipment 21 associated with a bench station 25 that articulate from a stowed position within an alcove 23 to a deployed position adjacently outside of the alcove 23. For example, as shown, an exercise bench 32 may be pivotably coupled to one or more walls of the alcove 23. The exercise bench 32 may be articulated to a deployed position by one or more pivoting deployment arms. The one or more deployment arms may be coupled to a rearward portion of the exercise bench 32. In a stowed position, the exercise bench 32 may be oriented within the alcove 23 with the rearward portion of the exercise bench 32 facing downward and a forward portion of the exercise bench 32 facing upward. In some embodiments, the exercise bench 32 may be pivoted forward or aft when in the stowed position. The deployment arms may allow the exercise bench 32 to fit within the alcove 23 such that the awning 22 may secure the exercise bench 32 therein when in the stowed position. The deployment arms may allow the exercise bench 32 to rest upon the ground adjacent to the alcove 23 when in the deployed position. In the deployed position, a rearward portion of the exercise bench 32 may be oriented towards the alcove 23. For example, the exercise bench 32 may be oriented perpendicular to the alcove 23 or obliquely facing the alcove 23 when in a deployed position. When using the exercise bench 32, an athlete may face away from the alcove 23 or towards the alcove, for example, depending on the particular exercise being performed. In some embodiments, the exercise bench 32 may be foldable at one or more locations for storage within the alcove 23. The alcove 23 may include a latch configured to secure the exercise bench 32 within the alcove 23. The alcove 23 may include one or more support structures, such as the one or more deployment arms and/or the latch, that support the weight of the exercise bench 32.

In some embodiments, the bench station 25 may include one or more cable towers 49 coupled to a wall within the alcove 23, such as to a back wall and/or to a side wall of the alcove 23. The cable towers 49 may be situated in a position within the alcove 23 that allow the exercise bench 32 to be stowed within the alcove 23, for example, between adjacently disposed cable towers 49. The one or more cable towers may include associated resistance weights and/or other resistance mechanisms, pulleys, handle attachments, and the like configured to allow pushing and/or pulling motions from the exercise bench 32, including upward, downward, lateral, and/or transverse pushing and/or pulling motions.

Referring further to PRIOR ART FIG. 20, in some embodiments, a mobile fitness plaza 10 may include one or more fitness bumpers 18. The fitness bumper 18 may include a bumper portion 17 configured to absorb and/or deflect a minor impact, such as may arise from time-to-time when transporting the mobile fitness plaza 10. One or more fitness station 20 may be integrated into a fitness bumper 18 and/or a fitness bumper 18 may respectively include and/or define one or more fitness stations 20. A fitness bumper 18 may be located at a forward portion and/or at an aft portion of a mobile fitness plaza 10. For example, as shown in PRIOR ART FIG. 20, a fitness bumper 18 may be provides as a front bumper to a fitness vehicle 12. Additionally, or in the alternative, a fitness bumper 18 may be provided as a rear bumper to a fitness vehicle 12. The fitness bumper 18 may be configured to stow and/or support one or more items of equipment 21 associated with a fitness station 20.

As shown in PRIOR ART FIG. 20, in some embodiments, a fitness bumper 18 may include a rope station 29. The rope station 29 may include one or more rope mounts 30 coupled to the bumper portion 17. In some embodiments, as shown, the rope station 29 may include a rope compartment 43 configured to stow the one or more exercise ropes 26. The rope compartment 43 may be defined at least in part by the bumper portion 17. For example, the rope compartment 43 may be disposed within an internal region of the bumper portion 17 defined by one or more walls of the bumper portion 17. The one or more exercise ropes 26 may be secured within the rope compartment 45 by door 47 and/or by a rope mount 30 located within the rope compartment 45. The door may pivot or slide open, such as in a lateral direction, an upward direction, or a downward direction. Additionally, or in the alternative, a rope mount 30 may be disposed about the fitness bumper 18 at a location external to the rope compartment 45. The rope mount 30 may be coupled to the fitness bumper 18. The rope mount 30 may be configured to couple one or more exercise ropes 26 thereto. For example, the rope mount 30 may include an anchor point to which the one or more exercise ropes 26 may be coupled. In some embodiments, the rope mount 30 may be configured to hold an exercise rope 26 in a coiled position.

As further shown in PRIOR ART FIG. 20, in addition or in the alternative to a rope station 29, a fitness bumper 18 may include a pivotable barbell station 33. The pivotable barbell station 33 may include a barbell-receiving apparatus coupled to the bumper portion 17 of the fitness bumper 18. The barbell receiving apparatus may include an apparatus commonly referred to as a "landmine" or a "t-bar." One or more barbell receiving apparatuses may be included at a respective pivotable barbell station 33. The barbell receiving apparatus may include a cylindrical tube pivotably coupled to a bracket. The bracket may couple the barbell receiving apparatus to the bumper portion 17. The cylindrical tube may be configured to receive an end portion, such as a sleeve portion, of a barbell. The cylindrical tube may have a diameter of about 2 inches, for example, coinciding with a diameter of an Olympic size barbell sleeve. The cylindrical tube may be pivotably coupled to the bracket with one or more degrees of freedom. The pivotable barbell station 33 may include a latch configured to secure the cylindrical tube to the fitness bumper 18 when in a stowed position. The barbell receiving apparatus may allow an athlete to perform various exercises, including rows, squats, presses, lunges, and the like. In some embodiments, a pivotable barbell station 33 may include two adjacent barbell receiving apparatuses configured and arranged for an athlete to perform bilateral exercises such as two-handed rows, two-handed presses, or the like.

Referring further to PRIOR ART FIG. 20, in some embodiments, a fitness station 20 may include one or more items of equipment 21 associated with a suspension station 31. The one or more items of equipment 21 associate with a suspension station 31 may include one or more cantilever arms 58. The one or more cantilever arms 58 may be coupled to a side of the mobile fitness plaza 10. As shown in PRIOR ART FIG. 20, a cantilever arm 58 may be coupled to a forward portion of the mobile fitness plaza 10, such as at a forward corner of the mobile fitness plaza 10. Additionally, or alternative, one or more cantilever arms 58 may be coupled to an aft portion of the mobile fitness plaza 10, such as at an aft corner, and/or to a forward wall, an aft wall, or a lateral wall of the mobile fitness plaza 10. In some embodiments, the suspension station 31 may be utilized with one or more items of equipment 21 that hang from a respective cantilever arm 58. The cantilever arm 58 may be configured and arranged to receive the respective one or more items of equipment 21, such as in a suspended or hanging position. For example, a cantilever arm 58 may be used to coupled one or more punching bags, such as a punching bag commonly referred to as a "heavy bag" and/or a punching bag commonly referred to as a "speed bag." Additionally, or in the alternative, a cantilever arm 58 may be used to support one or more suspension training straps or bands, such as TRX® straps or the like. The mobile fitness plaza may include a step to provide accessing to the cantilever arm 58, such as when attaching or removing equipment 21 from the cantilever arm 58. The cantilever arm 58 may have a suitable length to extend the suspended or hanging exercise equipment 21 away from the mobile fitness plaza 10, for example, to allow sufficient room for the equipment 21 to move or sway during use. A cantilever arm 58 may also be configured for use with any of a variety of other equipment 21 not explicitly described herein.

Referring further to PRIOR ART FIG. 20, in some embodiments, a fitness station 20 may include one or more items of equipment 21 associated with a pull-up station 35 and/or a dipping station 46. In some embodiments, a pull-up station 35 and/or a dipping station 46 may be incorporated into a common fitness station 20. As shown in PRIOR ART FIG. 20, a fitness station 20 may be configured and arranged about an aft portion of a mobile fitness plaza 10. For example, as shown, the aft portion of the mobile fitness plaza 10 may include adjacently disposed fitness stations 20 that respectively include a pull-up station 35 and a dipping station 46. A door 70 that provides access to an interior region 72 of the mobile fitness plaza 10 may be disposed between the respective fitness stations. The pull-up station 35 may include one or more pull-up bars 52 coupled to a wall of the mobile fitness plaza 10, such as an aft wall as shown. In some embodiments, one or more pull-up bars 52 may be disposed about other portions of the mobile fitness plaza 10. The dipping station 46 may include one or more platforms, 48, and one or more dipping handles 50.

In addition to the foregoing, a mobile fitness plaza 10 may include a variety of other exercise equipment 21 coupled to one or more walls of the mobile fitness plaza and/or within one or more alcoves 23. Additionally, or in the alterative, various items of equipment 21 may be stored within an interior region 72 of the mobile fitness plaza 10. Such other exercise equipment may be associated with any one or more of the plurality of fitness stations 20. In some embodiments, an exercise sled 53 may be removably stowed within an alcove 23, such as an alcove 23 associated with a power lifting station 39. For example, the exercise sled 53 may be removably coupled to a back wall of the alcove 23 such that the exercise sled 53 fits between adjacent towers of the barbell rack 44. Additionally, or in the alternative, one or more barbells may be coupled to a wall of the alcove 23, such as the alcove that includes the barbell rack 44. Additionally, or in the alternative, a hexagonal exercise bar 54 may be coupled to a wall of the alcove 23, such as the alcove that includes the barbell rack 44. In some embodiments, a plurality of exercise bands may be disposed within an alcove 23, for example, on a plurality of hooks or other storage elements. In some embodiments, any of the exercise equipment may be removed from an alcove 23 for use at the fitness stations 20. For example, either or both of the exercise bench 32 or the rowing machine 34 may be removably stored within the fitness stations 20 such that they may be fully removed during use. In some embodiments, the mobile fitness plaza 10 may include a floor exercise bar 56, which, for example, may be stored within an alcove 23 or an interior region 72 of the fitness vehicle 12. In some embodiments, a mobile fitness plaza 10 may include a medicine ball wall. For example, the medicine ball wall may include a portion of the aft wall, such as a portion of the door 70.

In some embodiments, one or more storage hooks 38 may be disposed within an alcove 23 associated with at least one of the fitness stations 20. For example, exercise bands may be secured by the storage hooks 38, as shown. In some embodiments, a storage rack 40 may be coupled within at least one of the alcoves 23. The storage rack 40 may be configured to stow a plurality of weights 42 or other equipment 21, such as dumbbells, barbell plates, kettlebells, medicine balls, exercise mats, barbells, or other equipment 21.

In some embodiments, a mobile fitness plaza 10 may include a powerlifting station 39 that includes one or more features configured and arranged as shown in PRIOR ART FIG. 20. As shown, in some embodiments, the powerlifting station 39 may include a barbell rack 44. The barbell rack 44 may fold into an alcove 23 via a plurality of arms, such as four (4) arms. The arms may be respectively attached to one or more uprights of the barbell rack 44. The outer portion of the arm may attach to the barbell rack upright via one or more plates that include a pin that allows for pivotable rotation. The arms may pivot under assistance provided by a shock, a gas spring, a strut, or the like. The arms may be attached to a storage system that may hold exercise equipment 21, such as dumbbells, medicine balls, bumper plates, and so forth.

Additionally, or in the alternative, a mobile fitness plaza 10 may include a rowing station 27 that includes one or more features configured and arranged as shown in PRIOR ART FIG. 20. As shown, the rowing station 27 may include a rowing machine 34. The rowing machine may be attached to a frame that has an "H-shaped" configuration. The frame may be formed of 2-inch square tubing. A pin/pivot point may be attached to a lower portion of the rowing machine 34, for example, under the fan portion of the rowing machine 35. The pin/pivot may allow the rowing machine 34 to pivot to a stowed position within the alcove 23. The pivoting of the rowing machine may have a range of motion of about 90 degrees, such as from about 75 degrees to about 115 degrees. The "H-shaped" frame may be coupled to a base of the alcove 23. A locking mechanism may be located adjacent to the "H-shaped" frame, such as to the left side thereof. The locking mechanism may hold the rowing machine 35 in an upright position, such as when stowed. The seat portion of the rowing machine 35 may stow adjacent to the fan portion of the rowing machine 35, such as in a in tray attached to a rear wall of the alcove 23.

Additionally, or in the alternative, a mobile fitness plaza 10 may include a bench station 39 that includes one or more features configured and arranged as shown in PRIOR ART FIG. 20. As shown, the bench station 39 may include an exercise bench 32. The exercise bench 32 may include a hinging mechanism. The hinging mechanism may be formed of 2-inch square tubing. The hinging mechanism may be about 24-inches long. The hinging mechanism may insert into a receiver attached to the exercise bench 32. A pin may be inserted thought the receiver to secure the exercise bench t32 o the hinging mechanism. The tubing may be attached to a bracket on the floor of the alcove 23. The bracket may include a pivot point allowing the exercise bench 32 to pivotably rotate to a slowed position. The pivoting of the exercise bench 32 may have a range of motion of about 90 degrees, such as from about 75 degrees to about 115 degrees.

The exercise bench 32 may include a square tubing receiver attached to a front lower portion of the bench via a flat metal plate, which may be bolted to the exercise bench 32. The plate may include one or more wheels, such as two wheels, on an outer portion, allowing the exercise bench 32 to be moved to a desired position, such as forward and back. The square tubing receiver and the square tubing received therein, may include a plurality of holes configured to receive a pin that secures the assembly to the alcove 23.

Additionally, or in the alternative, a mobile fitness plaza 10 may include a bench station 39 that includes one or more features configured and arranged as shown in PRIOR ART FIG. 20. As shown, the bench station 39 may include an exercise bench 32. The exercise bench 32 may include a hinging mechanism. The hinging mechanism may be formed of 2-inch square tubing. The hinging mechanism may be about 24-inches long. The hinging mechanism may insert into a receiver attached to the exercise bench 32. A pin may be inserted though the receiver to secure the exercise bench 32 of the hinging mechanism. The tubing may be attached to a bracket on the floor of the alcove 23. The bracket may include a pivot point allowing the exercise bench 32 to pivotably rotate to a slowed position. The pivoting of the exercise bench 32 may have a range of motion of about 90 degrees, such as from about 75 degrees to about 115 degrees.

Additionally, or in the alternative, a mobile fitness plaza 10 may include a suspension station 31 that includes one or more features configured and arranged as shown in PRIOR ART FIG. 20. Additionally, or in the alternative, a mobile fitness plaza 10 may include a resting station 41 that includes one or more features configured and arranged as shown in PRIOR ART FIG. 20. Additionally, or in the alternative, a mobile fitness plaza 10 may include a pull-up station 35 and/or a dipping station 46 that includes one or more features configured and arranged as shown in PRIOR ART FIG. 20. Additionally, or in the alternative, a mobile fitness plaza 10 may include a plurality of storage hooks 38 and/or a plurality of storage racks 40 configured and arranged as shown in any one or more of the Figures, including PRIOR ART FIG. 20. The plurality of storage hooks 38 and/or the plurality of storage racks 40 may include a kettlebell storage system configured to hold a plurality of kettlebells. The kettlebell storage system may include a plurality of attachments respectively configured to hold a kettlebell. A respective attachment may include a plate approximately 3-inches wide with a hook attached thereto.

As shown in the Figures, a mobile fitness plaza 10 may include one or more X-CREATE™ attachments. The one or more X-CREATE™ attachments may include one or more plyo-step attachments, one or more dip attachments, one or more multi-grip cross attachments, one or more ball targets, one or more horizontal mount ground rotational trainers, and so forth. As shown, the pull-up station 35 and/or the dipping station 46 may include such attachments, including one or more plyo-step attachments and/or one or more dip attachments. One or more of such attachments, such as one or more plyo-step attachments, may be modified to be fixed to the mobile fitness plaza 10 and/or to pivot into a stowed position and to be locked with a locking pin.

Referring now to PRIOR ART FIGS. 21A-21C, example embodiments of the present disclosure are further described. In some embodiments, the mobile fitness plaza 10 may be incorporated into fitness vehicle 12, as shown. In some embodiments, at least a portion of the mobile fitness plaza 10, such as one or more fitness stations 20 thereof, may have a relatively low ground clearance. The relatively low ground clearance may accommodate relatively large exercise equipment, such as the barbell rack 44, the rowing machine 34, the exercise bench 32, and so forth. By way of example, a ground clearance of a portion of the mobile fitness plaza 10 and/or a fitness station 20 thereof may be determined with reference to an axle axis, such as an axis of a forward axle 13 or an axis of a rear axle 15, adjacent to the respective portion of the mobile fitness plaza 10 and/or fitness station 10. In some embodiments, a portion of the mobile fitness plaza 10 and/or a fitness station 20 may have a bottom edge that is from 2 to 12 inches below an axle axis, such as from 2 to 6 inches, or such as from 6 to 12 inches below the axle axis. Additionally, or in the alternative, an alcove 23 may have a bottom edge that is from 2 to 12 inches below an axle axis, such as from 2 to 6 inches, or such as from 6 to 12 inches below the axle axis. In some embodiments, as shown, a mobile fitness plaza 10 may include a rear overhang that has a bottom edge that is sloped rearwardly upwards. The rearwardly upwards sloped bottom edge may provide suitable ground clearance when transporting the mobile fitness plaza 10, such as to avoid bottoming-out when travelling over various terrain. Further, embodiments are contemplated in which the at least one of the fitness stations have a bottom portion aligned above an axle axis or even with an axle axis.

In some embodiments, the mobile fitness plaza may include a climate control system 60. The climate control system 60 may be disposed on top of the mobile fitness plaza 10. In some embodiments, the climate control system 60 may be used to control a climate, such as a temperature and/or a humidity, within an interior region 72 of the mobile fitness plaza 10. Additionally, or in the alternative, the climate control system may be used to at least partially control a climate, such as a temperature and/or a humidity, in a region adjacent to one or more of the fitness stations 20. For example, the climate control system 60 may provide a supply of climate-controlled air through one or more vents that respectively discharge through one or more vents situated in proximity to a respective fitness station 20, such as to blow climate-controlled air onto athletes during use of the fitness stations 20. In some embodiments the one or more vents may be disposed within an alcove 23. Additionally, or in the alternative, the one or more vents may be disposed about an awning 22. For example, a flexible duct may be attached to an awning 22, and/or the awning 22 may include an internal duct, that supplies conditioned air in proximity to the fitness station 20, such as a region below the awning 22. The conditioned air may include cooled air and/or heated as may be suitable for various weather conditions. Additionally, or in the alternative, the conditioned air may include humidified air and/or dehumidified air as may be suitable for various weather conditions. Additionally, or in the alternative, the conditioned air may include mist or atomized vapor, such as to provide improved heat transfer from athletes' bodies. In some embodiments, the climate control system 60 may include one or more circulation fans. The circulation fans may be incorporated into a wall of an alcove 23 such that when the awnings 22 are in a deployed position, climate conditioned air may be projected outwards onto athletes when using the fitness station 20 associated with the alcove 23.

In some embodiments, one or more solar panels 62 may be disposed about the mobile fitness plaza 10, such as on top of the mobile fitness plaza 10. Additionally, or in the alternative, one or more solar panels may be disposed about an external side of one or more awnings 22. Energy from the solar panels 62 may be used, directly or indirectly, to provide electrical power to the mobile fitness plaza 10, to one or more of the fitness stations 20, to electrical systems or components thereof, and/or to electrically powered equipment associated therewith. Additionally, or in the alternative, energy from the solar panels 62 may be used, directly, or indirectly, to provide power to operate the fitness vehicle 12 and/or electrical systems or components thereof, and/or to electrically powered equipment associated therewith. For example, in some embodiments, the fitness vehicle 12 may be an electric or hybrid-electric vehicle that receives at least some electrical power, directly or indirectly, from the solar panels 62. The one or more solar panels 62 may be electrically coupled to one or more power storage banks, such as one or more batteries, one or more supercapacitors, or the like. Electrical energy generated by the solar panels 62 may be used to charge the one or more power storage banks. The power storage banks may store electrical energy generated by the one or more solar panels 62. The power storage banks may be used to provide electrical power to the mobile fitness plaza 10 and/or to the fitness vehicle 12, such as to the one or more of the fitness stations 20, to the electrical systems or components thereof, and/or to electrically powered equipment associated therewith. In some embodiments, the solar panels 62 may be adjustable such that the angle of the solar panels 62 may be adjusted automatically or manually to follow sunlight. In some embodiments, one or more lights 64 may be disposed about the mobile fitness plaza 10, such as within one or more of the alcoves 23 and/or about an exterior of the mobile fitness plaza 10 (e.g., on the top of the mobile fitness plaza 10, on an inward or outward wall of one or more awnings 22, and/or on one or more sides of the mobile fitness plaza 10). The lights 64 may receive electrical power from the power storage banks. In some embodiments, control of the one or more lights 64 may be provided by one or more lighting controls disposed within the cab 14, remotely, for example, via a key fob or a mobile application, or externally using an external lighting control disposed within one of the alcoves 23.

In some embodiments, a mobile fitness plaza 10 may include video and/or audio equipment, such as one or more display screens 68, one or more speakers 66, and associated equipment. The one or more display screens 68 and/or the one or more speakers 66 may be operated synchronously and/or independently. The video and/or audio equipment may be powered by the power storage banks. In some embodiments, the video and/or audio equipment may be housed behind a protective screen, such as a clear acrylic screen, for example, to protect the equipment from weather and/or damage. In some embodiments, the mobile fitness plaza 10 may include one or more tablets or other computer devices that may be used, for example, to operate video and/or audio equipment, to operate exercise equipment 21, and/or to log exercise data, and so forth. In some embodiments, the mobile fitness plaza 10 may include one or more power outlets, such as within an alcove 23 and/or at a location adjacent to a fitness station 20.

In some embodiments, the mobile fitness plaza 10 includes a video display screen 68, such as a television display that is mounted in the cab of the vehicle and oriented to be forward-facing towards a windshield of the vehicle such that the video display screen 68 is visible to one or more users positioned outside and in front of the vehicle. For example, the forward-facing video display screen 68 may be positioned such that the one or more users are able to watch the video display screen 68 while performing exercises with equipment attached to the modified bumper portion of the vehicle.

Referring now to PRIOR ART FIG. 22, an exemplary floor plan of a mobile fitness plaza 10 is shown. As shown in PRIOR ART FIG. 22, a mobile fitness plaza 10 may include an interior region 72. The interior region 72 may be at least partially surrounded by a plurality of alcoves 23. The interior region 72 may include a refrigerator 74 and/or a desk 76. The interior region 72 may be used to stow various items of equipment 21. The interior region 72 may be accessed by one or more doors 70, as shown, for example, in Prior Art FIG. 21C. The interior region may include one or more access panels, such as in the floor of the interior region, to access the power storage banks.

The mobile fitness plaza 10 may have dimensions selected at least in part based on the number of fitness stations 20 and/or the equipment 21 associated with the respective fitness stations. Additionally, or in the alternative, the dimensions of a mobile fitness plaza 10 may be selected at least in part based on the size of the alcoves 23 that may be suitable for storing equipment 21 therein, such as in a manner that allows the equipment 21 to be articulated from a stowed position within the alcove 23 to a deployed position adjacent to the alcove 23.

In various embodiments, a mobile fitness plaza 10 may include, and/or may be incorporated into a motor vehicle, such as a van, a truck, a sport-utility vehicle (SUV), a special purpose vehicle, or other suitable motor vehicle that has a gross vehicle weight rating suitable for the size and/or weight of the mobile fitness plaza 10. By way of example, the mobile fitness plaza 10 shown in PRIOR ART FIG. 20 may include and/or may be incorporated into a vehicle 12 that has a medium-duty commercial classification, such as a Class 3, Class 4, Class 5, or Class 6 medium-duty classification. A relatively smaller-capacity mobile fitness plaza 10 may include and/or may be incorporated into a vehicle 12 that has a light-duty commercial classification, such as a Class 1, Class 2A, or Class 2B light-duty classification. A relatively larger-capacity mobile fitness plaza 10 may include and/or may be incorporated into a vehicle 12 that has a heavy-duty commercial classification, such as a Class 7 or Class 8 heavy-duty classification. A vehicle with any other classification suitable for the size and/or weight of the mobile fitness plaza 10 may be utilized, such as a standard or small SUV; a minivan; a large, mid-size, or compact car; a subcompact or minicompact car; a motorcycle or off-road-vehicle, such as a two-, three-, or four-wheel vehicle; a bus, such as a coach, a school bus, a shuttle bus, a minicoach; an extended vehicle, such as a limousine; as well as combinations of these. In some embodiments, a mobile fitness plaza 10 and/or a fitness vehicle 12 may include and/or may be incorporated into a trailer, such as a trailer towable by a suitable vehicle 12. In still further embodiments, a mobile fitness plaza 10 and/or a fitness vehicle 12 may include and/or may be incorporated into a rail car, a marine vessel, a storage container, a human-powered vehicle, or an aircraft. In some embodiments, such as when the mobile fitness plaza 10 is incorporated into a fitness vehicle 12 that is drivable, the mobile fitness plaza 10 may include a cab 14. As shown, the cab 14 may be located at a frontward portion of the fitness plaza 10. In other embodiments, the cab 14 may be located at a midward portion or a rearward portion of the mobile fitness plaza 10.

Referring now to PRIOR ART FIG. 23, an exemplary mobile fitness plaza 10 is illustrated relating to some embodiments of the present disclosure. In some such embodiments, the mobile fitness plaza 10 includes one or more awnings. For example, the mobile fitness plaza 10 may include a first side awning 82 disposed at a first side of the mobile fitness plaza 10, a second side awning 84 disposed at a second side of the mobile fitness plaza and a rear awning 86 disposed at a rear side of the mobile fitness plaza 10. The awnings 82, 84, and 86 shown are illustrated with just a frame portion of each respective awning being visible. However, it should be understood that this is just an exemplary illustration and that a plate covering may be disposed over the frame portion such that light and objects may not pass through the awning. For example, in some embodiments, the awnings 82, 84, and 86 include an aluminum covering, which may be decorated with branding information, advertisements, and other forms of decoration. In some embodiments, the covering of the awning may be formed of an ultraviolet (UV)-resistant material to prevent sunlight from passing through the awnings.

Each of the first side awning 82 and the second side awning 84 may extend a substantial portion of the length of the mobile fitness plaza 10. Accordingly, the awnings 82 and 84 may be configured to provide shelter and shade to an area below each respective awning 82, 84. Additionally, a single awning at each side of the mobile fitness plaza 10 simplifies the process of deploying the awnings and accessing the exercise equipment disposed in the alcoves 23. For example, the alcoves 82, 84, and 86 may be selectively positioned between a stowed position in which the alcoves provide an enclosure and close over one or more of the alcoves 23 and a deployed position in which the alcoves project outward from a top portion of the mobile fitness plaza 10. In some embodiments, the alcoves 82, 84, and 86 may be configured to be locked into the deployed position at about a 90 degree angle such that the alcoves 82, 84, and 86 are positioned flush with a top surface of the mobile fitness plaza 10.

The side awnings 82 and 84 may be configured to close over two or more alcoves 23, as opposed to the awnings 22, as shown in PRIOR ART FIG. 20, which are configured to close over a single alcove 23. Further, the larger awnings 82 and 84 provide additional shaded coverage and do not have gaps for light to pass through. Further still, the awnings 82, 84, and 86 are configured to prevent rain and other forms of precipitation from falling upon users at the fitness stations. Additionally, the awnings 82, 84, and 86 may prevent debris from contacting the users and the exercise equipment.

In some embodiments, each of the awnings 82, 84, and 86 are configured to be supported by the one or more support elements 24, as shown. For example, the one or more support elements 24 may include any of a hydraulically or electrically actuated cylinder for supporting the awnings in the deployed upright position or for selectively opening and closing the awnings 82, 84, and 86. For example, in some embodiments, the one or more support elements 24 are selectively actuated such as by using one or more electric or hydraulic motors responsive to a user input. In one example, a user may provide said user input for opening/closing the awnings remotely via a button or other input mechanism attached to a vehicle key fob associated with the vehicle 12. Alternatively, or additionally, the user input may be provided via a button or input mechanism secured directly to the mobile fitness plaza 10 or fitness vehicle 12. Further still, in some embodiments, the user input may be provided via an application running on a smart phone or other mobile computing device.

In some embodiments, any of the awnings 82, 84, and 86 may comprise one or more electronic locks for locking the awnings in the stowed position. For example, an electronic deadbolt lock may be included at an end of each awning such that the deadbolt lock interfaces with a portion of the frame while the awnings are in the stowed position. Accordingly, the electronic deadbolt may be used to selectively lock and unlock the awnings to provide security to equipment stored within the alcoves 23. Additionally, or alternatively, other suitable forms of locking the awnings are contemplated, for example, any of mechanical, hydraulic, or magnetic locking mechanisms may be used.

The mobile fitness plaza 10, as shown in PRIOR ART FIG. 23, may include any number of the components described above, such as the rowing machine 34, powerlifting station 39, dipping station 46, one or more platforms 48, one or more dipping handles 50, climate control system 60, and solar panels 62. It should be understood that any of said components may be arranged differently than as shown. For example, the power lifting station 39 may be disposed in the rear most alcove 23, as shown, or in another alcove of the mobile fitness plaza 10, such as the front most alcove.

In some embodiments, the mobile fitness plaza 10 comprises a barbell storage 88, as shown. For example, the barbell storage 88 may be disposed within at least one of the alcoves 23 and mounted to either or both of a side wall and back wall of the respective alcove 23. In some such embodiments, the barbell storage 88 is configured to support a plurality of barbells such that the barbells can be stored within the respective alcove 23.

In some embodiments, a vertical dumbbell storage 90 is included. The vertical dumbbell storage 90 comprises a rigid frame including one or more slots for dumbbells to be placed in such that the dumbbells are suspended from a top portion of the respective dumbbell. Accordingly, the one or more slots comprise a cutaway portion sized for receiving the dumbbells. For example, said cutaway portion may be wider than a diameter of a handle portion of the dumbbell but narrower than a dumbbell head of the dumbbell.

In some embodiments, a medicine ball storage 92 is included on the mobile fitness plaza 10. The medicine ball storage 92 may comprise a horizontally oriented rod extending a substantial portion of the width of the respective alcove 23 configured to hold one or more medicine balls in place within the alcove 23. In some embodiments, the medicine ball storage 92 may be disposed above the vertical dumbbell storage 90, as shown. Further, embodiments are contemplated in which the medicine ball storage 92 is integrated directly into a top portion of the vertical dumbbell storage 90 such that the one or more medicine balls rest on a top surface of the vertical dumbbell storage 90 and are held in place by the horizontal rod of the medicine ball storage 92.

In some embodiments, the mobile fitness plaza 10 comprises a kettlebell storage 94, as shown. For example, the kettlebell storage 94 comprises a plurality of hooks for receiving handles of a respective plurality of kettlebells. In some embodiments, the kettlebell storage 94 may be mounted to a back wall of one of the alcoves 23, for example, within the alcove that includes the video display screen 68, as shown.

Referring now to PRIOR ART FIG. 24, a side view of an exemplary mobile fitness plaza 10 is illustrated relating to some embodiments of the present disclosure. The mobile fitness plaza 10 comprises awnings 82 (not shown), 84, and 86, as described above. The mobile fitness plaza 10 further comprises a plurality of alcoves 23, the one or more support elements 24, the rowing machine 34, the powerlifting station 39, the one or more cable towers 49, the dipping station 46 with the one or more platforms 48 and one or more dipping handles 50, the climate control system 60, the solar panels 62, the one or more speakers 66, the video display screen 68, the vertical dumbbell storage 90, the medicine ball storage 92, and the kettlebell storage 94, as shown and described above.

Additionally, or alternatively, in some embodiments, an audio input control device 96 is included in the mobile fitness plaza 10. For example, the audio input control device 96 may be configured to receive one or more user inputs for adjusting audio controls of the mobile fitness plaza 10. In some such embodiments, the audio input control device 96 may be coupled to the one or more speakers 66 mounted on the mobile fitness plaza 10 such that the audio input control device 96 controls audio of the one or more speakers 66. Further, in some embodiments, the audio input control device 96 is also coupled to the video display screen 68.

The dipping station 46 is shown in a deployed position, however, it should be understood that the dipping station 46 is configured to be folded into a stowed position such that the dipping station 46 with the one or more platforms 48 and one or more dipping handles 50 fits inside of the closed awning 86 with the one or more platforms 48 and one or more dipping handles 50 folded into an upright position. Accordingly, the one or more platforms 48 and one or more dipping handles 50 may be rotatably coupled to one or more pins disposed on a frame of the dipping station 46, as shown.

Additionally, in some embodiments, the components shown in PRIOR ART FIG. 24 may be mirrored on an opposing side of the mobile fitness plaza 10. Alternatively, in some other embodiments, the components may be arranged differently or entirely different equipment may be stored on the opposing side.

Referring now to PRIOR ART FIG. 25, a view of a front portion of an exemplary mobile fitness plaza 10 is illustrated relating to some embodiments of the present disclosure. The mobile fitness plaza 10 includes the fitness vehicle 12 with the fitness bumper 18 disposed on the bumper portion 17 of the fitness vehicle 12, as shown. In some embodiments, a video display screen 68 is disposed in the cab 14. Said video display screen 68 may be front facing such that the video display screen 68 is visible to one or more users positioned in front of the mobile fitness plaza 10. In some embodiments, the video display screen 68 may be mounted to a bracket secured to a roof portion of the cab 14, as shown. Further, the video display screen 68 (and the bracket) may be pivotably coupled such that the video display screen 68 can be adjusted into a stowed position while driving as to not obstruct a view of a driver of the vehicle 12.

In some embodiments, one or more pivotable barbell stations 33 may be pivotably mounted to the fitness bumper 18, as shown. For example, the each of the one or more pivotable barbell stations 33 may comprise a barbell sleeve configured to receive an end of an exercise bar. Said barbell sleeve may be pivotably attached to the bumper portion 17 such that the barbell sleeve can be stowed in an upright position when not in use, for example, while the vehicle 12 is in motion. In some embodiments, the pivotable barbell stations 33 further comprise at least one latch 102 configured to selectively secure the barbell sleeve in the upright stowed position while the vehicle 12 is in motion.

In some embodiments, the mobile fitness plaza 10 further includes one or more rope mounts 30 disposed on the fitness bumper 18. For example, the rope mount 30 may include a loop 104 configured to receive at least one exercise rope such as the one or more exercise ropes 26 as described above. However, it should be understood that, in some embodiments, additionally, or in the alternative, the rope mount 30 may be disposed elsewhere within the mobile fitness plaza 10. For example, embodiments are contemplated in which the rope mount 30 including the loop 104 is disposed beneath the kettlebell storage 94 on a top surface of a wheel well of the vehicle 12. Additionally, in some embodiments, the mobile fitness plaza 10 further comprises one or more mounting adapters 106 configured to interface with one or more exercise devices. For example, the mounting adapter 106 may be configured to interface with an exercise cable device such that the exercise cable device can be selectively mounted onto the fitness bumper 18.

Referring now to PRIOR ART FIG. 26, an exemplary alcove compartment 23 is illustrated relating to some embodiments of the present disclosure. The alcove compartment 23 comprises the powerlifting station 39, the vertical dumbbell storage 90, and the medicine ball storage 92 disposed therein. Additionally, the exercise sled 53 may be stored in the alcove compartment 23 while not in use, as shown. Further, the kettlebell storage 94 may be mounted within an adjacent alcove, as shown.

In some embodiments, the barbell storage 88 is configured to receive a plurality of barbells, as shown. For example, one or more protrusions may be included within the barbell storage 88 for supporting the barbells in an upright position during storage. In some embodiments, the barbell storage 88 may be disposed within the alcove 23 below the vertical dumbbell storage 90 positioned beneath the vertical dumbbell storage 90 with enough clearance space such that the dumbbells hanging from the vertical dumbbell storage 90 do not contact the barbells stored in the barbell storage 88, as shown.

In some embodiments, the vertical dumbbell storage 90 is disposed within the alcove 23, as shown. The vertical dumbbell storage 90 may include the rigid frame with a plurality of slots, each respective slot comprising a cutaway portion for receiving a handle portion of at least one dumbbell. Further, in some embodiments, the vertical dumbbell storage 90 may be sloped upwards at a front most face of the frame such that the dumbbells, when stored, are biased towards a back portion of the vertical dumbbell storage 90 to thereby prevent the dumbbells from being unintentionally removed from the vertical dumbbell storage 90. For example, the dumbbells are biased towards a back portion of the vertical dumbbell storage 90 to prevent the dumbbells from being jostled loose while the vehicle 12 is in motion.

In some embodiments, the medicine ball storage 92 is integrated into a top portion of the vertical dumbbell storage 90 such that there is no gap or space between the vertical dumbbell storage 90 and the medicine ball storage 92. Alternatively, in some embodiments, the vertical dumbbell storage 90 and the medicine ball storage 92 are separate structural components and may even be disposed in distinct alcoves 23 of the mobile fitness plaza 10. The medicine ball storage 92 may include a base portion that is sloped upwards at a front most face of the base portion to bias one or more medicine balls disposed thereon toward a back wall of the alcove 23 to prevent the medicine balls from being jostled loose while the vehicle 12 is in motion, similar to the frame of the vertical dumbbell storage 90, as described above.

In some embodiments, the exercise sled 53 may be disposed within the alcove 23 for storage. For example, the exercise sled 53 may be placed in the alcove 23 on a floor portion of the alcove 23. Further, the exercise sled 53 may be removably secured in place using at least one bungie cord 108 mounted to the frame of the vertical dumbbell storage 90, as shown. For example, the bungie cord 108 may be secured to an opening within the frame of the vertical dumbbell storage 90. Further, embodiments are contemplated in which other attachment means, not explicitly described herein may be secured to the opening of the frame of the vertical dumbbell storage 90.

In some embodiments, the mobile fitness plaza 10 further comprises any number of additional features and components. For example, embodiments are contemplated in which the mobile fitness plaza 10 includes one or more external fans disposed, for example, within one or more of the alcoves 23. The one or more fans may be configured to direct cooling air outwards from the mobile fitness plaza 10 to users of the one or more fitness stations. Further, in some embodiments, the mobile fitness plaza 10 further comprises one or more external misters configured to spray cooling water onto one or more users standing outside of the mobile fitness plaza 10. In some such embodiments, the one or more misters may be coupled to a water cooling system of the mobile fitness plaza 10 such as a water cooler attached to the beverage dispenser 36. In some embodiments, the mobile fitness plaza 10 further comprises at least one security camera. For example, a 360 degree security camera may be disposed on a top surface of the back portion of the vehicle 12.

Further, in some embodiments, additional features may be integrated into the components described above with respect to the mobile fitness plaza 10. For example, in some embodiments, a shock system may be integrated into any of the exercise equipment pivotably mounted within the alcoves 23 such that the shock system provides a biasing force to assist the exercise equipment into the upright stowed position. Said biasing force may further prevent unintentional deployment of the exercise equipment from the alcoves 23. Further still, in some embodiments, other means for holding the exercise equipment in the stowed position are also contemplated. For example, in some embodiments, any combination of locks, latches, clips, bungie cables, straps, or other suitable locking means are contemplated.

Although the presently disclosed subject matter has been described with reference to the embodiments illustrated in the attached drawing figures, it is noted that equivalents may be utilized and substitutions made herein without departing from the scope of the invention recited in the claims.

The invention claimed is:

1. A multi-use exercise equipment anchor system, comprising:
    a motor vehicle mounted tubular receptacle in line with the motor vehicle comprising a an inner wall comprising a radial circumference comprising linear lobes and clefts;
    a tubular member having a first end portion a distance from a second end portion;
    the first end portion comprising an outer wall comprising a radial circumference comprising linear lobes and clefts at least partially mating with and adapted for insertion and inserted into the motor vehicle mounted tubular receptacle and extending from the tubular receptacle when so inserted with the second end portion free standing, wherein the first end portion is immovably welded to the second end portion along a diagonal joint and the second end portion diagonally declines from the first end portion to a point proximate the surface on which the motor vehicle is positioned.

2. The multi-use exercise equipment anchor system of claim 1, wherein the vehicle mounted tubular receptacle is mounted a distance from a longitudinal center line of the vehicle.

3. The multi-use exercise equipment anchor system of claim 1, wherein the first end portion further comprises a circumferential outer diameter different from the a circumferential outer diameter of the second end portion.

4. The multi-use exercise equipment anchor system of claim 1, wherein the length of the first end portion is less than the length of the second end portion.

5. The multi-use exercise equipment anchor system of claim 1, wherein the second end portion further comprises a one or more through holes.

6. The multi-use exercise equipment anchor system of claim 1, wherein the second end portion further comprises one or more blind holes.

7. The multi-use exercise equipment anchor system of claim 1, wherein the second end portion further comprises one or more threaded holes.

8. The multi-use exercise equipment anchor system of claim 1, wherein the second end portion further comprises one or more loops.

9. The multi-use exercise equipment anchor system of claim 1, wherein the second end portion further comprises a socket.

10. The multi-use exercise equipment anchor system of claim 9, wherein a shaft is inserted into the socket, the shaft comprising exercise elastic bands.

11. The multi-use exercise equipment anchor system of claim 1, wherein the second end portion further comprises a socket insert.

12. The multi-use exercise equipment anchor system of claim 1, wherein the first end portion and the second end portion further comprise a gusset plate disposed proximate the respective diagonal joints and a diagonal bend location.

13. The multi-use exercise equipment anchor system of claim 1, further comprising a swivel landmine fixture removably attached to the second end portion.

14. The multi-use exercise equipment anchor system of claim 1, further comprising a battle rope removably attached to the second end portion.

* * * * *